US011323252B2

(12) United States Patent
Higley et al.

(10) Patent No.: US 11,323,252 B2
(45) Date of Patent: May 3, 2022

(54) RELAY NETWORK FOR ENCRYPTION SYSTEM

(71) Applicant: Atakama LLC, New York, NY (US)

(72) Inventors: Christopher Higley, New York, NY (US); Alexander Pinkerton, New York, NY (US); Erik A. Aronesty, New York, NY (US); Daniel Gallancy, New York, NY (US)

(73) Assignee: Atakama LLC, New York, NY (US)

( * ) Notice: Subject to any disclaimer, the term of this patent is extended or adjusted under 35 U.S.C. 154(b) by 92 days.

(21) Appl. No.: 17/067,245

(22) Filed: Oct. 9, 2020

(65) Prior Publication Data

US 2021/0111889 A1 Apr. 15, 2021

Related U.S. Application Data

(60) Provisional application No. 62/913,846, filed on Oct. 11, 2019.

(51) Int. Cl.
*H04L 9/08* (2006.01)
*H04L 29/06* (2006.01)
*H04L 9/30* (2006.01)

(52) U.S. Cl.
CPC ............... *H04L 9/085* (2013.01); *H04L 9/30* (2013.01); *H04L 63/0435* (2013.01)

(58) Field of Classification Search
CPC ...................................................... H04L 9/085
See application file for complete search history.

(56) References Cited

U.S. PATENT DOCUMENTS

| 10,516,527 | B1 * | 12/2019 | Machani | H04L 9/0625 |
|---|---|---|---|---|
| 2009/0214030 | A1 | 8/2009 | Price, III | |
| 2012/0321086 | A1 | 12/2012 | D'Souza et al. | |
| 2013/0212393 | A1 | 8/2013 | D'Souza | |
| 2018/0004930 | A1 | 1/2018 | Csinger et al. | |
| 2019/0288834 | A1 * | 9/2019 | Black | H04L 9/0822 |
| 2019/0288840 | A1 | 9/2019 | Gallancy et al. | |
| 2021/0058238 | A1 * | 2/2021 | Bursell | H04L 9/085 |
| 2021/0083882 | A1 * | 3/2021 | Venable, Sr. | H04L 9/3247 |

FOREIGN PATENT DOCUMENTS

| EP | 2606604 | 6/2013 |
|---|---|---|
| EP | 2947812 | 11/2015 |

* cited by examiner

*Primary Examiner* — Bradley W Holder
(74) *Attorney, Agent, or Firm* — Schwegman Lundberg & Woessner, P.A.

(57) ABSTRACT

A method comprises registering, by a first device having a public key, with a gateway server by providing a proof of work based on the first device public key and encrypting and decrypting data using cryptographic information transmitted via the gateway server between other devices similarly registered.

19 Claims, 14 Drawing Sheets

RELAY NETWORK FOR ENCRYPTION SYSTEM

CROSS-REFERENCE TO RELATED APPLICATION

This application claims the benefit of U.S. provisional patent application No. 62/913,846 filed on Oct. 11, 2019, and titled "Relay Network," which is incorporated by reference herein in its entirety.

TECHNICAL FIELD

The disclosed teachings generally relate to data encryption and/or decryption. The disclosed teachings more particularly relate to relaying data between devices in an encryption system.

BACKGROUND

Conventionally, encryption systems rely only one or two devices to encrypt and decrypt files. However, when multiple devices are used for encryption and decryption, data may not be transferred efficiently between devices.

SUMMARY

Embodiments provide a method, computing device that can execute the method and a computer-readable storage device having instructions for executing the method. The embodiments may enable more efficient transmission of data in an encryption system. A method comprises registering, by a first device having a public key, with a gateway server by providing a proof of work based on the first device public key and encrypting and/or decrypting data using cryptographic information transmitted via the gateway server between other devices similarly registered.

For example, encrypting data with a first device's symmetric key (e.g., key for a symmetric cipher); generating, with a threshold cryptography data-sharing scheme, a plurality of key shards based on the symmetric key such that the symmetric key can be reconstituted from less than all of the plurality of key shards; encrypting the plurality of key shards with public keys from, respectively, a plurality of devices; transmitting, through the gateway, the encrypted plurality of key shards and encrypted data to at least one queue in a queue service, wherein there is one queue for each device of the plurality of devices; triggering a cloud message from a cloud message service to one or more devices of the plurality of devices corresponding to the at least one queue, thereby causing the one or more devices to connect to a network hosting the queue service; transmitting the encrypted plurality of key shards and encrypted data from the queue service to the one or more devices corresponding to the at least one queue; and storing the encrypted data and the plurality of key shards encrypted with the plurality of devices' public keys in one or more non-transitory memory devices such that the encrypted data is secured at one of the one or more non-transitory memory devices and decryptable with the plurality of key shards encrypted with the first devices' public keys by reassembling the plurality of key shards encrypted with the plurality of devices' public keys into the first device's symmetric key.

This Summary is provided to introduce a selection of concepts in a simplified form that is further described below in the Detailed Description. This Summary is not intended to identify key features or essential features of the embodied subject matter, nor is it intended to be used to limit the scope of the embodied subject matter. Other aspects of the disclosed embodiments will be apparent from the accompanying Figures and Detailed Description.

BRIEF DESCRIPTION OF THE DRAWINGS

One or more embodiments of the present invention are illustrated by way of example and not limitation in the figures of the accompanying drawings, in which like references indicate similar elements.

DETAILED DESCRIPTION

Figure 1:
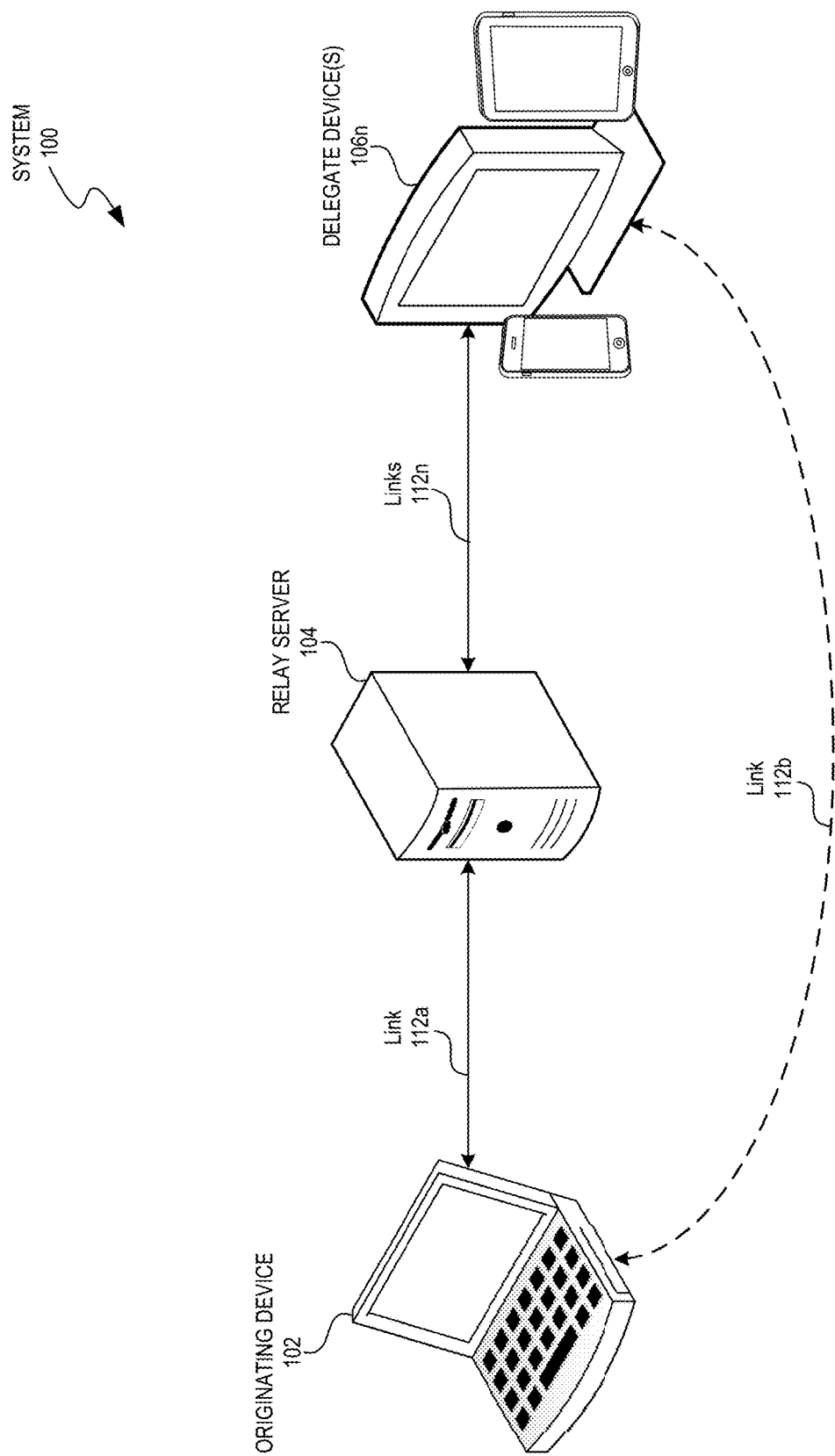
FIG. 1 is a block diagram that illustrates a system for implementing passwordless encryption of data-at-rest according to some embodiments of the present disclosure.

The embodiments set forth below represent the necessary information to enable those skilled in the art to practice the embodiments and illustrate the best mode of practicing the embodiments. Upon reading the following description in light of the accompanying figures, those skilled in the art will understand the concepts of the disclosure and will recognize applications of these concepts that are not particularly addressed herein. It should be understood that these concepts and applications fall within the scope of the disclosure and the accompanying claims.

The purpose of terminology used herein is only for describing embodiments and is not intended to limit the scope of the disclosure. Where context permits, words using the singular or plural form may also include the plural or singular form, respectively.

Terms such as "processing," "computing," "calculating," "determining," "displaying," "generating" or the like, unless specifically stated otherwise, may refer to actions and processes of a computing device that manipulates and transforms data represented as physical (electronic) quantities within the computer's memory or registers into other data similarly represented as physical quantities within the computer's memory, registers, or other such storage medium, transmission, or display devices.

The terms "connected," "coupled," or variants thereof, as used herein, may refer to any connection or coupling, either direct or indirect, between two or more elements. The coupling or connection between the elements can be physical, logical, or a combination thereof.

The terms "channel" or "link" contemplate a means of communicating data or information, whether wired or wireless, and may utilize digital cellular transmission standards (e.g., CDMA, W-CDMA, LTE, HSPA+). Examples include Bluetooth, Wi-Fi, Ethernet, USB, USB-C, Thunderbolt, auditory link, or visual link (e.g., QR code and camera). A message may be communicated directly between two devices or indirectly through another device (e.g., a relay device) on one or more channels/links.

The term "target data," as used herein, may refer to data targeted for encryption. Examples of target data may include photos, documents, spreadsheets, audio files, video files, or any type of encryptable data files. Other examples include data stored in database tables, passwords, emails stored on a computer, or any data object.

The disclosed embodiments include techniques for securing data stored on a memory of a computing device. In some embodiments, a method includes encrypting data stored on a memory of a computing device with a block cipher using cryptographic key(s). Several key shards can be generated based on any of the cryptographic key(s) via a threshold cryptography data-sharing scheme. In some embodiments, each key shard of a cryptographic key can be encrypted with its own unique public key. An encrypted shard can be distributed to one of an array of physically distinct computing devices, which can each have a private key for its encrypted key shard. The cryptographic key can be reconstituted with a threshold number of computing devices that utilize their private keys to decrypt their respective key shards. Specifically, the threshold number of decrypted key shards can be used to reconstitute the cryptographic key, which can then be used to decrypt the encrypted data.

In conventional systems, a significant portion of data-at-rest that is stored at a computing device is not encrypted by default because of the challenges associated with password and cryptographic key management. Maintaining a sufficient quantity of unique keys and passwords to adequately secure all target data is challenging in any system, from consumer-grade to enterprise level. Home and enterprise users need access to hundreds or even thousands of individual data objects on a regular basis, and are unable to memorize or adequately keep track of many high-entropy passwords that would be required to secure target data. Accordingly, users are reluctant to embrace additional passwords for data encryption because they are already inundated with passwords for different sites, services, and apps.

A solution to securing large volumes of data-at-rest includes using a single master password as a key to decrypt numerous data objects stored in a container (e.g., a folder) stored in memory. This type of data security system is vulnerable to attack and, if compromised, will expose the numerous data objects with the single master password. For example, password manager tools such as DASHLANE and LASTPASS utilize a single password which, if compromised, would provide an attacker with access to all the data encrypted with that single password. The risk grows exponentially due to increased efforts in computer hacking and the proliferation of viruses, malware, and ransomware developed by bad actors to exploit vulnerabilities of existing key and password management tools.

Securing data-at-rest is complicated by the risk of losing keys or passwords. Unfortunately, users have grown accustomed to password retrieval mechanisms of websites such that they expect the ability to reset lost passwords that secure their data-at-rest. For example, when a user loses a password to access data of an enterprise system, the user expects that a network administrator can readily send a reset link or code to facilitate resetting the lost password. However, password resets are not possible in the context of encryption of data-at-rest because a decryption algorithm cannot be performed without access to the key or password. A solution to this problem includes so-called "back doors," which have been utilized to provide emergency access to data when a key or password is lost. However, the back doors create vulnerabilities that can be exploited by bad actors. Due to these limitations, most individual users and enterprises do not encrypt the vast majority of their data-at-rest.

Another solution is full-disk encryption, which has been utilized to provide security for physical loss or theft of hard drives. However, full-disk encryption does not protect against computer viruses, malware, ransomware or hackers who are able to gain control of a system. In an enterprise, if data-at-rest is encrypted, central management of encryption keys is often utilized to enable recovery of data when passwords are misplaced, lost, or forgotten. However, a centralized system creates a vulnerability as a treasure-trove of keys for attackers. In addition, full-disk encryption does not protect user data (e.g., email) stored on third-party platforms such as remote cloud storage providers.

The disclosed embodiments overcome the drawbacks of conventional systems by enabling the ability to secure large volumes of data-at-rest with "passwordless" encryption. Hence, unlike conventional systems, the disclosed embodiments do not necessarily require a user to undertake the burdensome step of inputting a password to access any data-at-rest. In fact, each data object can be encrypted with a separate unique cryptographic key that users are not required to explicitly store, memorize, manage, and safeguard to later decrypt any of the encrypted data objects. Instead, the disclosed embodiments require limited and periodic involvement by a user to decrypt any number of data objects while securing each data object with a block cipher using a unique cryptographic key. A "cryptographic key" or "key," as used herein, may refer to a string of bits used by a cipher to transform plain text into cipher text or vice versa. The key remains private and ensures secure storage and communication until the decryption event.

As described in greater detail below, a number of key shards can be generated based on a cryptographic key of a block cipher used to encrypt a data object. In some embodiments, the key shards are derived from the cryptographic key via a threshold cryptography data-sharing scheme. The key shards may be, for example, portions of a cryptographic key that collectively form the cryptographic key such that assembling the key shards would reconstitute the cryptographic key. While embodiments are described herein generally in the context of data-at-rest, files, or data objects in general, those skilled in the art will appreciate that the various embodiments could include implementations for database entries, smartphone files (e.g., image files), emails contained in an inbox (e.g., email on a MS Exchange server or in a Gmail inbox), etc.

The disclosed embodiments can include combinations of hardware and/or software. For example, an embodiment includes a security service that can operate on data stored on a computer storage medium. In another example, an embodiment can include an application distinct from an operating system or file system to separately operate on the data stored in the file system. In yet another example, an embodiment is integrated into an existing file system to provide a simplified interface to users for readily storing an accessing encrypted data-at-rest.

FIG. 1 is a block diagram that illustrates a system for implementing passwordless encryption of data-at-rest according to some embodiments of the present disclosure. As shown, the system 100 includes components such as an originating device 102, a relay server 104, and an array of delegate devices 106n. The originating device 102 can communicate over link 112a with the relay server 104, which can communicate with the delegate devices 106n over links 112n. In some embodiments, the components of the system 100 communicate as part of a security service of the originating device 102. In some embodiments, the originating device 102 and the delegate devices 106n can bypass the relay server 104 to communicate over a link 112b such as, for example, a wireless radio link (e.g., BLUETOOTH) or some other direct or indirect means of communication.

An "originating device," as used herein, is a computing device from which data-at-rest can be accessed. The data-at-rest can be stored at a local memory of the originating device 102 or stored at a remotely located memory of another computing device. In some embodiments, an originating device is a device on which new content is created or preexisting content is modified. In some embodiments, an originating device may be operated as a general-purpose computer running special-purpose software or a special purpose hardware device.

Examples of an originating device include a computer, smart or dumb terminal, a point-of-sale (POS) device, network computer, set-top box, game player, mobile device, wireless device, wireless telephone, personal digital assistant, media (e.g., music and/or video) player, camera, information appliance, workstation, minicomputer, mainframe computer, or any other device that can store or access data-at-rest. Specific examples of an originating device include a desktop computer, laptop computer (e.g., APPLE MACBOOK, LENOVO 440), smartphone (e.g., APPLE IPHONE, SAMSUNG GALAXY, NOKIA LUMINA), tablet computer (e.g., APPLE IPAD, SAMSUNG NOTE, AMAZON FIRE, MICROSOFT SURFACE), or any other computing device that can store or access data-at-rest. Although a single originating device 102 in shown in system 100, the disclosed embodiments can include any number of originating devices.

The originating device 102 can access one or more memories that store data. The memories can include non-volatile memory for storing data-at-rest. For example, the originating device 102 may include or access memory that stores a file system or an email archive. The memories can include volatile memory that stores data-in-use. In some embodiments, the memories include a local storage device and/or cloud-based storage device that can separately or collectively store data objects. The storage devices may be removable or non-removable computer readable storage media such as magnetic hard disk drives, solid-state drives, network-attached storage, flash memory devices, optical drives, remote cloud storage, etc. Other types of storage media that can be used in exemplary operating environments include, but are not limited to, magnetic tape cassettes, flash memory cards, DVDs, digital video tape, solid-state random-access memory (RAM), solid state read-only memory (ROM), etc. The storage media are typically connected to a system bus through a removable or non-removable memory interface.

In some embodiments, a special-purpose software application may be installed on the originating device 102 to practice elements of the disclosed operations, and to facilitate communication with other components of the system 100 including the relay server 104 and the delegate devices 106n. In some embodiments, the originating device 102 may also serve as a delegate device. A distinction between the originating device 102 and the delegate devices 106n is there function in the process of encrypting or decrypting data-at-rest with one or more cryptographic keys. In particular, the originating device 102 can access the encrypted data-at-rest stored in a local or remote memory and the delegate devices 106n can provide respective key shards used to derive the cryptographic key for encrypting or decrypting the data-at-rest stored by the originating device 102. As such, the delegate devices 106n can secure encrypted data-at-rest and authorize decryption of the encrypted data-at-rest by messaging key shards to the originating device 102.

A "delegate device," as used herein, may refer to a computing device on which private keys may be stored and on which key shards of cryptographic keys may be stored. A "key shard," as used herein, may refer to a data item of a threshold number of data items from which a cryptographic key can be reconstituted (e.g., derived). The delegate devices 106n can include any combination of computing devices such as those described herein with respect to the originating device 102.

The delegate devices 106n may include any device that has been configured, via software or hardware, to communicate securely with the originating device 102 (e.g., through the relay server 104) or among the delegate devices 106n. In some embodiments, the delegate devices 106n are portable computing devices (e.g., smartphones, tablet devices, laptop devices) but can further include any device that is accessible to the user and capable of communicating with the originating device 102 or among the delegate devices 106n. Examples include a desktop computer, smart or dumb terminal, a POS device, network computer, set top box, game player, mobile device, wireless device, wireless telephone, personal digital assistant, media player (e.g., music player, video player), camera, information appliance, workstation, minicomputer, mainframe computer, or any other device with similar computing functionality.

The relay server 104 may securely deliver messages and notifications between the originating device 102 and the delegate devices 106n. For example, the relay server 104 may represent any number of server computers that can relay key shards between the originating device 102 and the delegate device 106n over the links 112a-n. The user interface may be used to facilitate management of the encrypted data-at-rest by distributing and collecting key shards among the delegate devices 106n. In some embodiments, the relay server 104 may collect and store the encrypted data provided by the originating device 102 and/or the delegate devices 106, and provide that data to any of the other devices. The relay server 104 may include a combination of hardware and software that is well known to persons skilled in the art and, as such, a description is omitted herein for the sake of brevity.

The links 112*a-n* may include any combination of private, public, wired, or wireless portions. Any data communicated over the links 112*a-n* may be encrypted or unencrypted at various locations or along different portions of the links 112*a-n*. Each component of the system 100 may include combinations of hardware and/or software to process the data, perform functions, communicate over the links 112*a-n*, and the like. For example, any component of the system 100 may include a processor, memory or storage, a network transceiver, a display, operating system, and application software (e.g., for providing a user interface), and the like. Other components, hardware, and/or software included in the system 100 that are well known to persons skilled in the art are not shown or discussed herein for the sake of brevity.

The ability to communicate over a wireless radio link 112*b* (e.g., BLUETOOTH, Wi-Fi) allows the originating device 102 to bypass the relay server 104, to encrypt and decrypt data-at-rest by retrieving key shard(s) directly from delegate device(s). Direct access by the originating device 102 to the delegate devices 106*n* is useful when any of the links 112*a* or 112*n* is down or inaccessible. Communication links, particularly those established between the delegate devices 106*n* and the originating device 102 may require modifications to the delegate devices or information presented on a mobile device such as a quick response (QR) code. In some embodiments, all communications, regardless of intermediary, are secured by encrypting data with the destination device's public key.

Therefore, the system 100 can implement passwordless encryption of data-at-rest by using a combination of symmetric cryptography, asymmetric cryptography, and threshold cryptography implemented by multiple computing devices. For example, advanced encryption standard (AES) or another cipher can be employed by the originating device 102. In some embodiments, the key shards are fragments of a cryptographic key that are the outputs of a configurable threshold secret-sharing scheme such as Shamir's secret sharing scheme, Blakley's scheme, or Chinese remainder theorem-based secret sharing. In some embodiments, the sharing scheme is operable to represent the cryptographic key with N fragments of which only M are required to reconstitute the original BC cryptographic key. Accordingly, the delegate devices 106*n* can provide a threshold number of key shards required to reconstruct a cryptographic key. Thus, the originating device 102 can decrypt data by accessing the threshold number of key shards rather than requiring input of the cryptographic key in its entirety.

Figure 2:
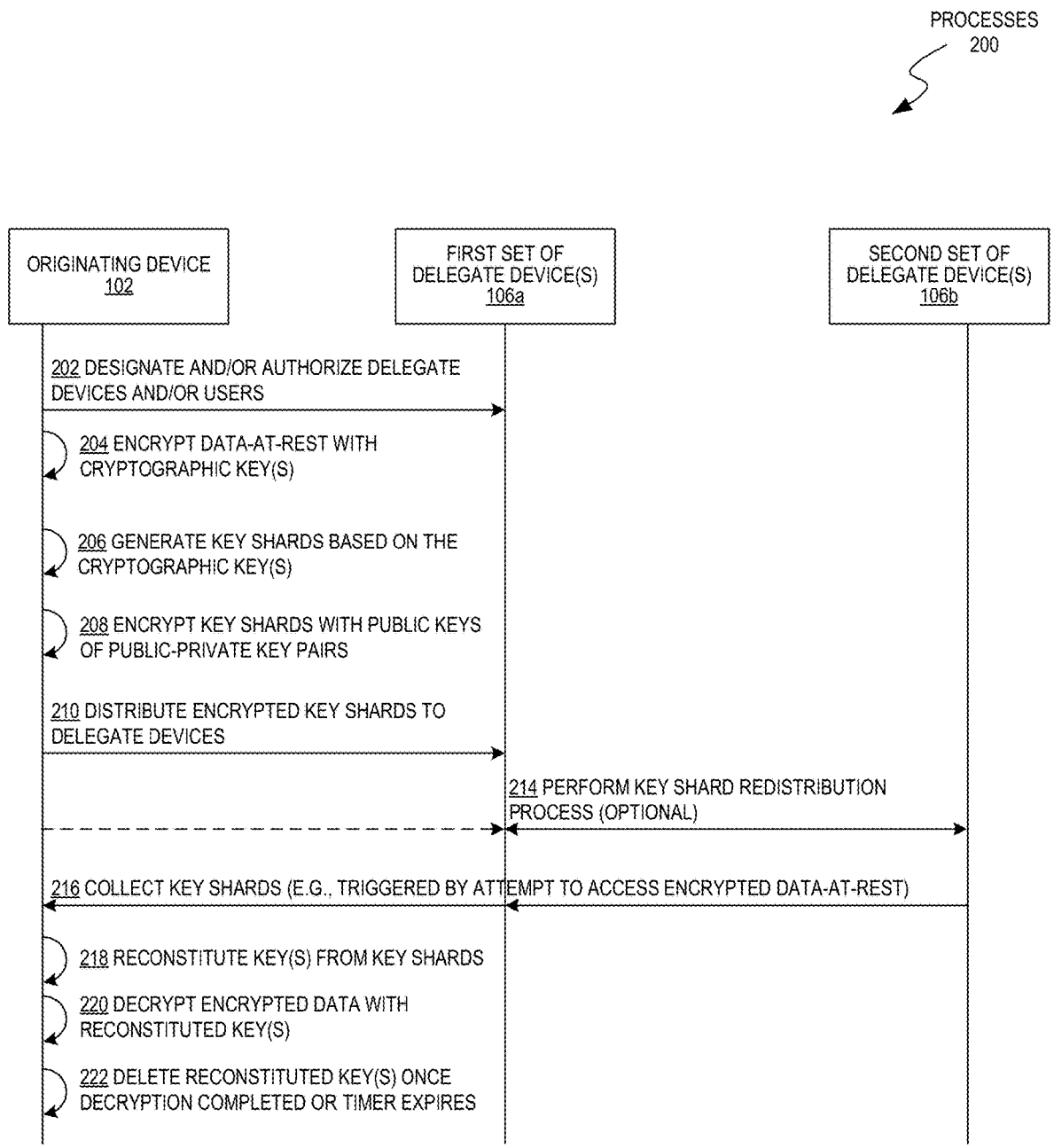
FIG. 2 is a flow diagram that illustrates various processes for passwordless security of data-at-rest according to some embodiments of the present disclosure.

FIG. 2 illustrates various processes of the disclosed passwordless techniques for securing data-at-rest. The disclosed techniques include the use of a combination of symmetric cryptography, asymmetric cryptography, and configurable threshold cryptography to manage encryption and/or decryption of data-at-rest. The processes 200 can be a performed by the originating device 102 and delegate devices 106*a-b* as part of a security service. The originating device 102 or delegate devices 106*a-b* can include a variety of different devices such as those discussed with reference to FIG. 1.

The originating device 102 and/or delegate devices 106*a-b* may belong to a user that is authorized to access and decrypt data objects with the originating device 102. In some instances, at least some of the delegate devices 106*a-b* may belong to users that are not authorized to access the encrypted data. The memory storing the encrypted data may be a local memory of the originating device 102 and/or a remote memory, and the encrypted data is stored on the local or remote memory.

In step 202, a user of the originating device 102 can designate a set of computing devices as delegate devices 106*a* or authorize a user of the delegate devices 106*a*. In some of the embodiments, each of the delegate devices 106*a* is physically separate from each other and/or could include the originating device 102.

In step 204, the originating device 102 encrypts target data with a cryptographic key. The cryptographic key may be created specifically to encrypt the target data. For example, the cryptographic key may be a string of bits of a symmetric key for use in a block cipher capable of transforming plain text into cipher text and vice versa. In some embodiments, the cryptographic key is generated temporarily to encrypt data-at-rest and is thereafter deleted.

The target data may include various types of data objects (e.g., image, document, spreadsheet, audio file, video file) that are each encrypted with respective cryptographic keys. Examples include a file system with various files and instructions for encrypting the files, an email archive system with emails and instructions for encrypting the emails, a database system records and instructions for encrypting the messages, etc. The encrypted target data is stored on a non-transitory computer memory that can be accessed by the originating device 102.

In step 206, the originating device 102 generates N key shards based on the cryptographic key. The cryptographic key can be derived (reconstituted) from a necessary and sufficient threshold number M of the N key shards. For example, the set of N key shards can be generated via a threshold cryptography data-sharing scheme. When the user wants to decrypt the encrypted target data, M-of-N key shards are processed to reconstitute the cryptographic key. The set of key shards can be stored locally and/or distributed among the delegate devices 106*a-b*. As used herein, a "key shard" of a cryptographic key may also be referred to as a component, fragment, or by any other term that indicates a part or element of a set of key shards.

To aid in understanding data-sharing schemes, consider an W order polynomial that could be reconstituted from W+1 points of that polynomial. For example, consider a second order polynomial $aX^2+bX+c$ where the cryptographic key is represented by the constant term c. The polynomial can be reconstituted with any three points of the polynomial. Examples of a sharing scheme include Shamir's Secret Sharing Scheme, Blakley's scheme, secret sharing using the Chinese remainder theorem, or any other sharing scheme understood by persons skilled in the art. In one simple example, a cryptographic key such as the password "secret" can be used to encrypt target data, split into the shards "sec" and "ret," and reassembled later to decrypt the encrypted target data.

Figure 3:
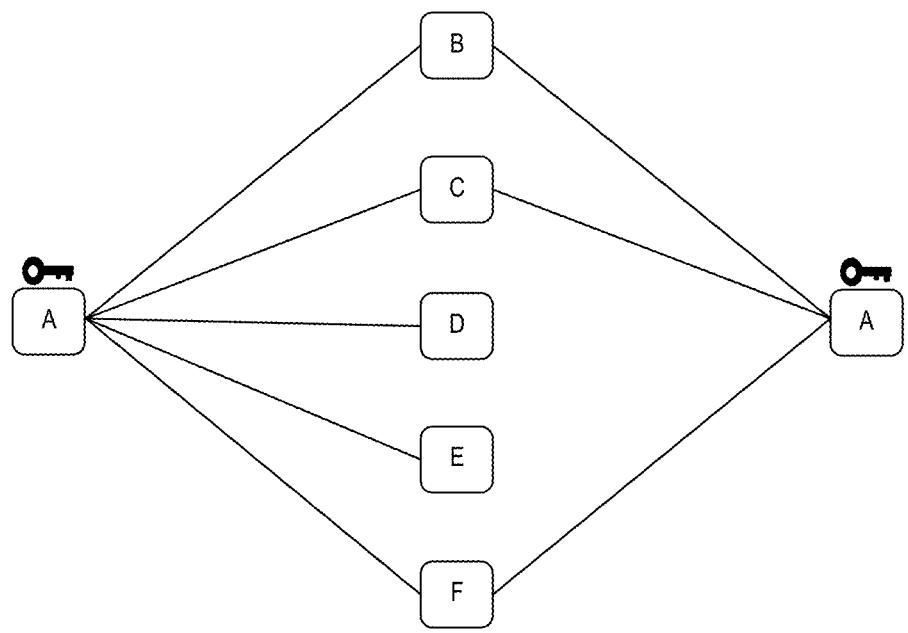
FIG. 3 is a block diagram of an example process for generating key shards, based on a cryptographic key, of which a threshold number can be used to reconstitute a cryptographic key according to some embodiments of the present disclosure.

For example, FIG. 3 is a block diagram of an example process for generating a set of key shards, based on a cryptographic key, of which a threshold number of the key shards can be used to reconstitute a cryptographic key. As shown, device A is an originating device and devices B through F are delegate devices. A set of key shards can be distributed across combinations of the computing devices A, B, C, D, E, and/or F. The illustrated example is of a three-of-five configuration where only three key shards are required to reconstitute the cryptographic key and remaining devices are superfluous. Thus, losing access to any two-of-five computing devices B through F would not prevent the originating device 102 from reconstituting the cryptographic key because the key shards from the remaining computing devices are sufficient to do so. Note, however, that the cryptographic key cannot be reconstituted from a subset of the key shards that is less than the threshold number (e.g., two key shards). The reconstituted cryptographic key can then be used to decrypt or encrypt data.

The disclosed embodiments include an asymmetric key pair that is generated for each delegate device 106a. The key pair includes a delegate public key and a delegate private key. These two keys may be created together using a key generation technique such as RSA or elliptic curve key pairs. The delegate asymmetric key pair may be generated at a delegate device. The delegate private key may be kept exclusively on the delegate device and never shared or exported to another computing device. In contrast, the delegate public key is shared or exported for use by another delegate device or the originating device. In some embodiments, the key shards can be encrypted with the delegate public keys to produce encrypted key shards that can be securely communicated to their delegate devices. The mechanism for encryption and the choice of key strength may be configurable and may include, for example, RSA, ECIES, ElGamal and other encryption schemes with similar functionality Each delegate device may generate a delegate key pair including a delegate private key and delegate public key. Each delegate device can retain its respective delegate private key. For example, delegate device D1 could retain private key K-1, delegate device D2 could retain private key K-2, and so on. Each of the N delegate devices may also distribute its delegate public key to any other delegate device and each originating device such that all delegate devices and originating devices have all the delegate public keys and originating device public keys.

A backup key pair may be generated with a backup public key distributed to the various originating devices as well. The decision whether to generate a backup public key may depend on user or administrator preference. Hence, the disclosed embodiments may employ other key pairs that improve security. For example, an embodiment may employ a backup asymmetric key pair, which includes a backup public key and a backup private key. These backup key pairs may be generated by a computing device when offline by using a key generation technique such as RSA or elliptic curve key generation. The backup private key can be kept on the offline computer while the backup public key can be exported for use by other computing devices.

In step 208, each of the N key shard is encrypted with one of N public keys associated with a respective delegate device to create N encrypted key shards. In addition, any metadata associated with the original data is authenticated, for example via MAC or by including the metadata in the shard. The originating device 102 may have access to all the public keys of the delegate devices 106a such that the originating device 102 can use the public keys to encrypt the key shards for respective delegate devices 106a. The delegate devices 106a hold respective counterpart private keys that can be uses to decrypt their respective key shards as needed.

In some embodiments, the cryptographic key is optionally encrypted using a backup public key to create an encrypted cryptographic key that can be decrypted using a backup private key. The backup keys are generally created and stored in an offline environment. For example, a file system (FS) can encrypt the target data by using the cryptographic key. The FS can store the encrypted key shards with the encrypted target data in an archive file on disk. In addition, if a backup public key was created, it may be used to encrypt the cryptographic key, which may then be added to the archive file.

Figure 4:
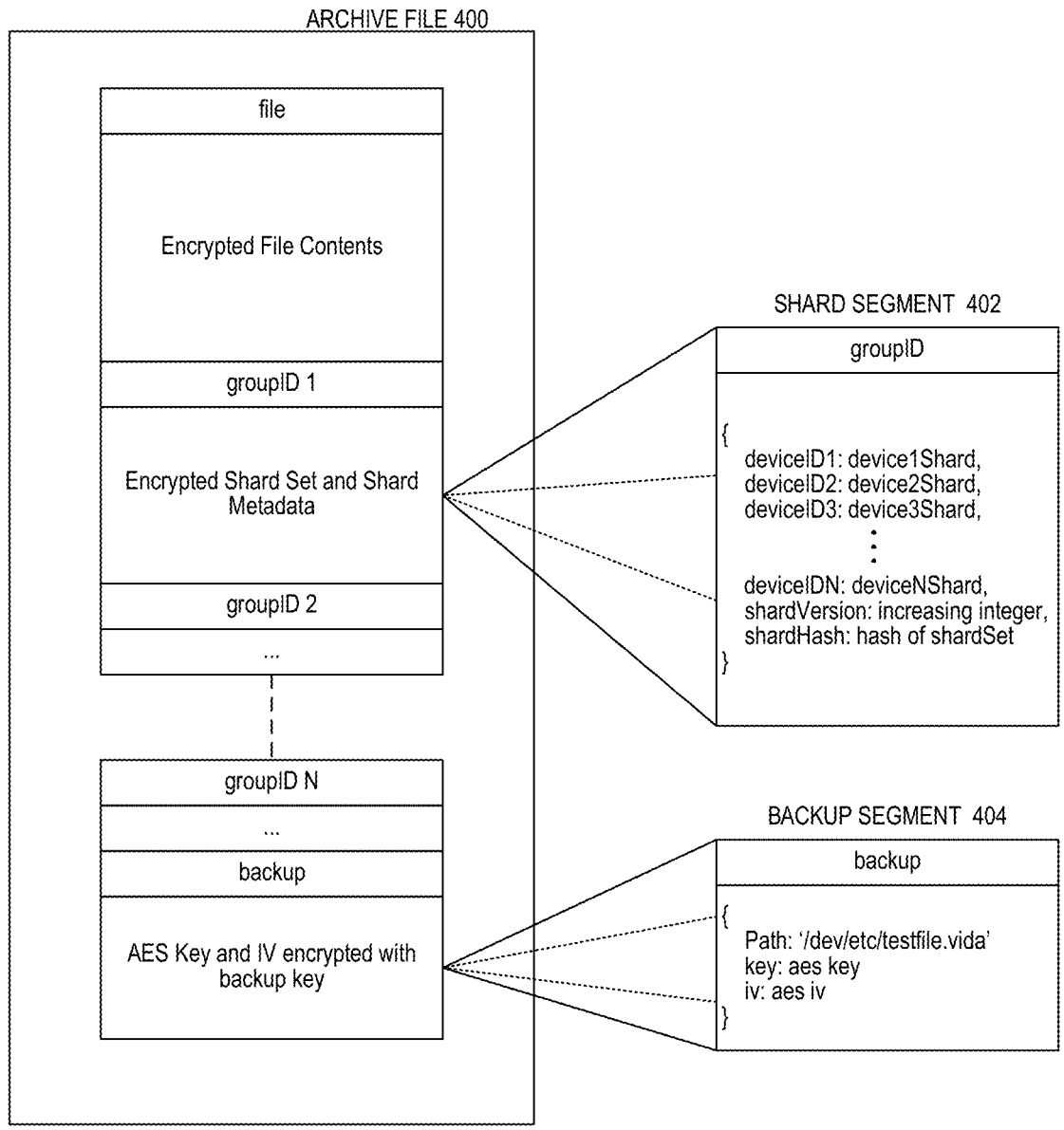
FIG. 4 is a block diagram illustrating an archive file according to some embodiments of the present disclosure.

An "archive file," as used herein, is a customized file format in which target data that has been encrypted with, for example, a BC using a cryptographic key may be stored together with any combination of encrypted versions of the cryptographic key (or related keys), encrypted key shards, or encrypted key sub-key shards. For example, FIG. 4 is a block diagram that depicts an archive file 400 according to some embodiments of the present disclosure. The archive file 400 has a file structure including a shard segment 402, and backup segment 404.

As shown, the archive file 400 may include an entire cryptographic key that has been encrypted with a backup public key or another asymmetric encryption technique. Hence, decryption of an archive file may require additional cryptographic information to produce a decrypted version of the cryptographic key. In some instances, additional sets of encrypted key shards are added in the archive file. The additional sets of encrypted key shards may be used to open files. With the encrypted key shards added to the archive file, the encryption process is complete. In some embodiments, at least some of the encrypted key shards are optionally sent to the delegate devices 106a to further improve security. Optionally distributing the N encrypted key shards to the delegate devices 106a reduces the network traffic required to decrypt data and redistribute shards. Encrypted target data is recoverable with the key shards stored at the delegate devices 106a.

For example, in step 210 of FIG. 2, the N encrypted key shards are distributed among the first set of delegate devices 106a such that the originating device 102 is incapable of decrypting the encrypted target data due to an absence of a cryptographic key and the keys shards from which the cryptographic key can be reconstituted. For example, the originating device can communicate with a relay server to distribute the shards among the delegate devices 106a.

In some embodiments, distributing the N encrypted key shards involves establishing a wireless link (e.g., Wi-Fi, BLUETOOTH, cellular), a wired link (e.g., Ethernet, USB), visual link, or auditory link between the originating device 102 and the delegate devices 106a. For example, at least one of the N key shards can be communicated over a computer network to at least one of the set of delegate devices 106a that are remotely located from the originating device 102. In another example, at least one of the N key shards is communicated over a short-range radio link to at least one of the set of delegate devices 106a that is located remote from the originating device 102. The delegate devices 106a may be temporarily or intermittently coupled to the originating device 102 to communicate the key shards.

In some embodiments, a local security service can extract a set of encrypted key shards from an archive file. The originating device 102 may pass the set of encrypted key shards to a communication service, which distributes the encrypted shards to respective delegate devices. Communication among the delegate devices 106a may be direct (e.g., on the same LAN, via BLUETOOTH or Ethernet connection) or via a relay server or onion routing scheme.

Key Shard Redistribution Process

The disclosed embodiments include a key shard redistribution process to replace or add a delegate device to an existing set of delegate devices. If an existing delegate device is lost, stolen, destroyed, rendered obsolete, or is otherwise inaccessible, it can be replaced with another delegate device according to the redistribution process. In some embodiments, the threshold number of key shards required to reconstitute a cryptographic key may be the same or different from the threshold number of key shards required for the redistribution process. Moreover, the redistribution process can be used to change the threshold number of devices required to reconstitute a cryptographic key.

In step 214, the optional redistribution process is performed to generate a second set of key shards based on a combination of the first set of key shards. The second set of key shards is generated from a first threshold number of the first set of key shards, and may include some or none of the first set of key shards. The number of the second set of key shards may be the same or different than the first set of key shards. The cryptographic key is capable of being reconstituted from either the first set of key shards or the second set of key shards. Further, the second set of key shards may be generated without ever reconstituting the cryptographic key.

In some embodiments, the redistribution process involves generating intermediary sub-key shards from the first set of key shards, and then generating the second set of key shards from the sub-key shards. The sub-key shards are distributed among the second combination of devices that can generate the second set of key shards based on the sub-key shards. As such, a type and number of the first set of delegate devices that holds the first set of key shards can change to a second set of delegate devices that holds the second set of key shards. Hence, the second combination of delegate devices may include some or none of the first combination of delegate devices.

Figure 5:
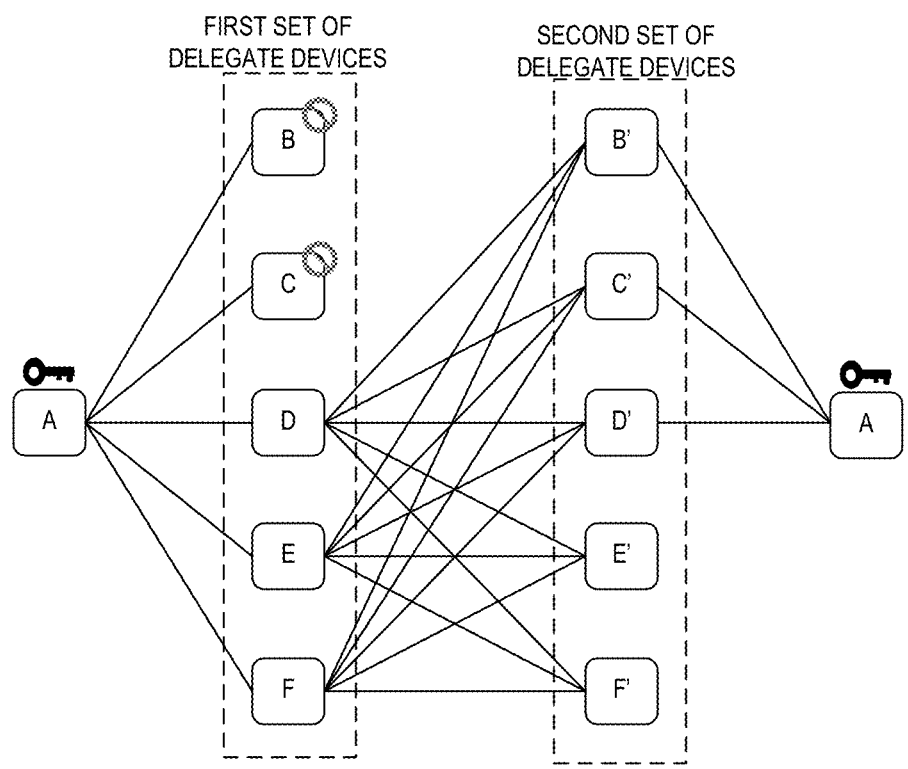
FIG. 5 is a block diagram of an example key shard redistribution process according to some embodiments of the present disclosure.

FIG. 5 is a block diagram that illustrates an example process for generating new key shards from a threshold number of existing key shards such that a cryptographic key can be reconstituted from a new threshold number of the new key shards according to some embodiments of the present disclosure. In the illustrated example, a three-of-five configuration is required to perform the redistribution process and to reconstitute the cryptographic key. That is, only three key shards are required to replace any number of the first set of delegate devices and only three new key shards are required to reconstitute the cryptographic key.

The redistribution process requires decrypting only a threshold number of encrypted key shards. The threshold number of unencrypted key shards may be made available from the archive file or from the respective delegate devices on which they reside. The threshold number of unencrypted shards are inputs to a redistribution process that produces a new set of unencrypted key shards, which can be encrypted with the private keys of the second set of delegate devices (including any new delegate devices), resulting in more encrypted key shards compared to the original number of key shards. The new encrypted key shards can be added to the archive file of the originating device and may be distributed to additional delegate devices.

As shown, the originating device A generates five key shards based on a cryptographic key, and distributes the five key shards to the first set of delegate devices B through F. The device B is a primary delegate device (e.g., user's smartphone), and the delegate devices C through F are backup delegate devices (e.g., each a tablet computer). Assume that devices B and/or C are lost or otherwise inaccessible. A user can operate a GUI on the originating device A (or a remaining delegate device) to trigger a redistribution process to the new delegate devices B' through F'.

A set of sub-key shards are created as an intermediate step in the process to create the new set of key shards for the second set of delegate devices B' through F'. As used herein, "sub-key shards" may refer to key shards generated based on other key shards and which have been created in accordance with a redistribution process that extends the sharing scheme to create a new set of key shards from a preexisting subset of a threshold number of key shards. Of the new set of key shards, only another threshold number may be required to reconstitute the original cryptographic key. Therefore, the new threshold and new number of key shards need not be the same as the original threshold and original number of key shards, respectively.

As shown, the originating device A works in consort with the delegate devices D, E, and F to produce sub-key shards for the delegate devices B' through F'. The delegate device D will produce sub-key shards D-1 through D-5, the delegate device E will produce sub-key shards E-1 through E-5, and the delegate device F will produce sub-key shards F-1 through F-5. The sub-key shards D-1, E-1, and F-1 are for the new delegate device B'. The sub-key shards D-2, E-2, and F-2 are for the new delegate device C'. The sub-key shards D-3, E-3, and F-3 are for the new delegate device D'. The sub-key shards D-4, E-4, and F-4 are for the new delegate device E', and the sub-key shards D-5, E-5, and F-5 are for the new delegate device F'. The new key shards are derived from the sub-key shards at the respective new delegate devices B' through F'.

Therefore, the new set of delegate devices B' through F' replace the old set of delegate devices B through F. The new key shards may be encrypted with the respective public key of the delegate devices B' through F'. The new encrypted key shards can be added to the archive file of the originating device A, and may be distributed to other remaining delegate devices. Except for the missing shards, the remaining encrypted key shards may be made available at the archive files or at respective delegate devices on which they reside. There is no need to reconstitute the cryptographic key during the redistribution process, nor are three-of-five decrypted shards required at any device during the redistribution process. Instead, the cryptographic key only needs to be reconstituted to decrypt or encrypt target data. Further, a minimum threshold number of delegate devices and respective key shards are needed to reconstitute the cryptographic key. In this instance, three-of-five new key shards are required to reconstitute the cryptographic key.

The ability to limit the need to reconstitute the cryptographic key only to decrypt or encrypt target data improves the security of the target data. For example, needing to reconstitute cryptographic keys for numerous data objects to create new sets of key shards is undesirable because this would create a vulnerability. In particular, a bad actor that knows that a redistribution process will occur because the bad actor stole a delegate device could snoop to capture cryptographic keys for data object during that process. Hence, the embodiments mitigate the risk of this vulnerability by avoiding the need to reconstitute any cryptographic key except to encrypt or decrypt data objects.

Although FIG. 5 illustrates a process for replacing an entire first set of delegate devices with the second set, the redistribution process can be utilized to replace any number of delegate devices, as long as the threshold number of the original delegate devices are available for the redistribution of key shards. Moreover, the redistribution process can be used to add an infinite number of different combinations of delegate devices. For example, consider a situation where the first set of delegate devices only includes D, E, and F. After performing a redistribution process, the second set of delegate devices may include B', C', D, E, and F.

Therefore, the disclosed embodiments include techniques for incorporating other computing devices into a set that stores key shards. This includes adding or replacing selected computing devices to create a new combination of computing devices that store the set of key shards required to reconstitute a cryptographic key from the threshold number of key shards, and then re-sharding the cryptographic key to generate a new set of key shards for a new combination of computing devices.

Decryption Process

In step 216, the decryption process may be invoked when a user of the originating device 102 attempts to open a file, read data from a database, or otherwise access an encrypted data object. For example, a file opening process may be interrupted by a file system (FS) handler or operating system handler, which recognizes the file that contains the encrypted data object. In some embodiments, the originating device 102 collects at least the threshold number of decrypted key shards from the delegate devices 106a and/or 106b. For example, the originating device 102 can cause the delegate device 106a-b to communicate their respective key shards to the originating device 102.

In some embodiments, the delegate devices 106a-b can check with users in possession of respective delegate devices as to whether to permit the decryption event. The request for permission may be presented in a variety of forms such as a text or SMS message, a popup notification, LED display, or other format built-in to the operating system or provided by system software and available hardware. The user may accept the request for a decryption event. In some embodiments, a request is automatically denied after a predetermined period expires.

In an M-of-N configuration, only a threshold M of the total N key shards are required to reconstitute a cryptographic key. Of the N corresponding delegate devices, one or more are primary (i.e., authorizing) devices and the remainder are secondary devices. For example, in a 2-of-3 configuration in which there is a laptop, a smartphone, and a tablet, the laptop could be the originating device, the smartphone could be the primary delegate device, and the tablet could be a delegate secondary device. In this example, reassembly of the cryptographic key requires participation by only two devices: the originating device and the smartphone. Participation by a secondary device is not necessary unless the primary delegate device is unavailable.

In some embodiments, a user in possession of a delegate device may, contingent on the name, type, path or other target data metadata, set a threshold for a number of automatic affirmative responses to requests for decryption. For example, the threshold may be set to automatically decrypt the next 10 shards received or automatically decrypt all shards received during the next 12 hours. If decryption is permitted, the delegate device can decrypt its respective encrypted key shard and return the decrypted key shard to the originating device 102 via a relay server or other communication channel, or can be re-encrypted for transit to the originating device 102. The key shards received by the originating device can be used to reconstitute the cryptographic key, which is delivered to the FS or operating system. The target data may then be decrypted and opened.

In step 218, the originating device 102 reconstitutes a cryptographic key from key shards collected from the originating device 102 and/or the delegate devices 106a-b. In some embodiments, at least some or all of the key shards are required to reconstitute the cryptographic key. Specifically, the cryptographic key is reconstituted from a threshold number of the key shards collected from the originating device 102 and/or the delegate devices 106a-b. Then, in step 220, the originating device decrypts the encrypted target data stored on a non-transitory computer memory with the reconstituted cryptographic key.

In some embodiments, any reconstituted cryptographic keys are enabled for only a period sufficient to decrypt the encrypted data. For example, in step 222, any reconstituted cryptographic keys are automatically deleted after completing decryption of the encrypted target data. In some embodiments, a cryptographic key and any copies of key shards are made inoperable or deleted from the originating device 102 such that any cryptographic key for decrypting the encrypted data is unavailable or underivable except during decryption or encryption of target data.

The disclosed embodiments also include a process for modifying encrypted data. The data that has been encrypted according to the encryption process described herein can be decrypted according to the decryption process described herein. The decrypted data can then be modified, and again encrypted according to the encryption process described herein.

The disclosed embodiments also include a key rotation process. For example, a user or a system may wish to rotate or change the cryptographic keys used for encrypting target data. Key rotation can be accomplished by decrypting the target data by using a first cryptographic key in the decryption process described herein and then re-encrypting the target data by using the encryption process described herein, but with a second cryptographic key that is different from the first cryptographic key.

The originating device may be operating under the control of an operating system that provides a file system, which controls how data is stored and retrieved. In some embodiments, the originating device may be configured to run a virtual file system (VFS), an interface layer or abstraction layer that insulates the application program from the file system implementation, and can provide a common interface to multiple types of file systems. If a VFS is utilized, the VFS can respond to application-level calls for file operations including opening, reading, writing, and appending to files stored on the device. The VFS can also respond to handling encryption events applicable for each file operation. If the originating device is not running a VFS, the originating device's operating system may respond directly to application-level calls for file operations and handling encryption events applicable for each file operation.

Figure 6:
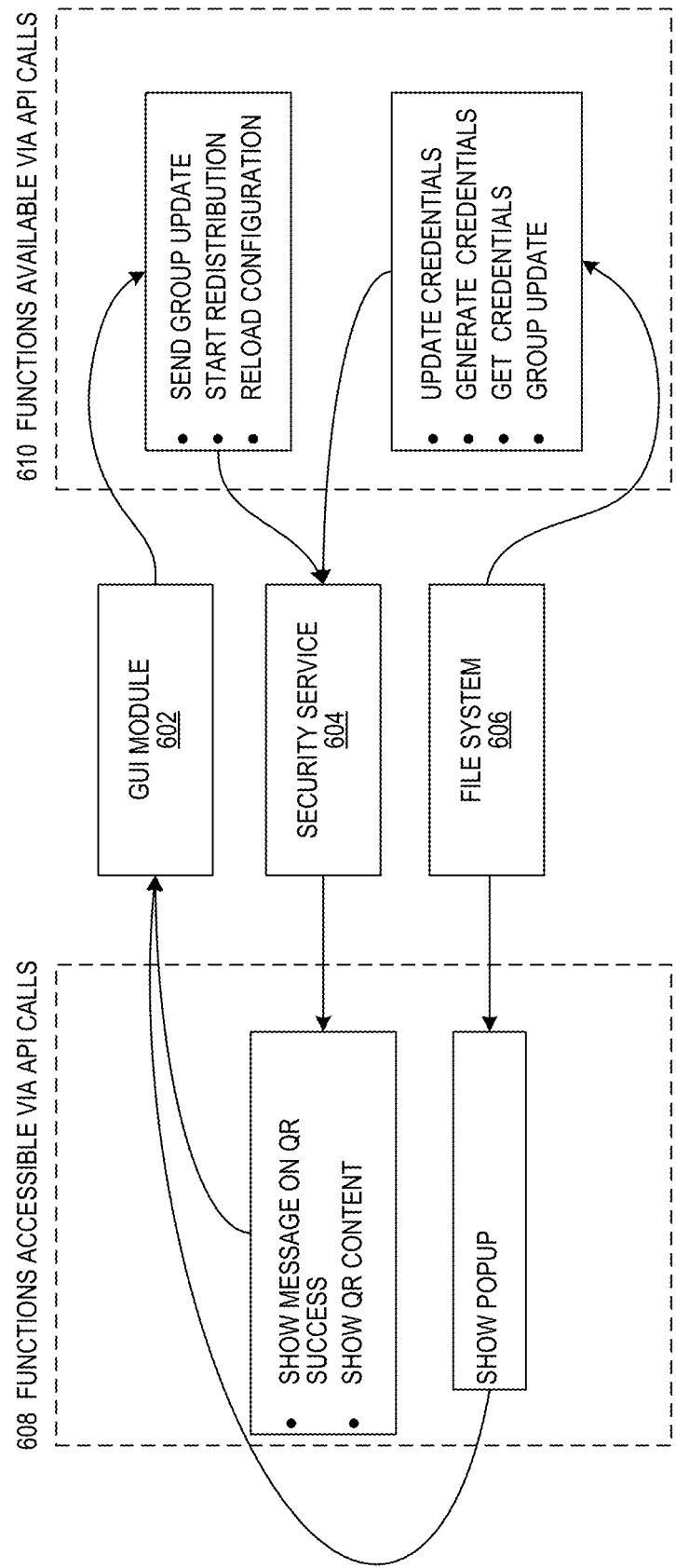
FIG. 6 is a block diagram that illustrates components of an originating device operable to secure data-at-rest according to some embodiments of the present disclosure.

For example, FIG. 6 is a block diagram that illustrates components of an originating device operable to perform at least some of the processes 200. For example, the originating device may include a graphical user interface (GUI) module 602 that facilitates interactions with a user. The originating device may also include a security service 604, a file system 606, and various functions accessible or available via API calls 608 and 610. Tasks such as adding or removing a delegate device, system configuration, controlling alerts, and other features may be managed by a user through the GUI module 602.

In some embodiments, the originating device's security service 604 is a program that runs at an originating device, though it could be running elsewhere such as on a dedicated server. For example, the security service can accept requests from a file system (e.g., virtual file system (VFS), a file system built into the computer's operating system, a customized file system or otherwise) to reconstitute a cryptographic key used to decrypt content of an archive file. In some embodiments, the security service is part of a special-purpose software application installed on the originating device to enable the disclosed cryptographic operations and facilitate communications with a relay server and/or delegate device.

Figure 7:
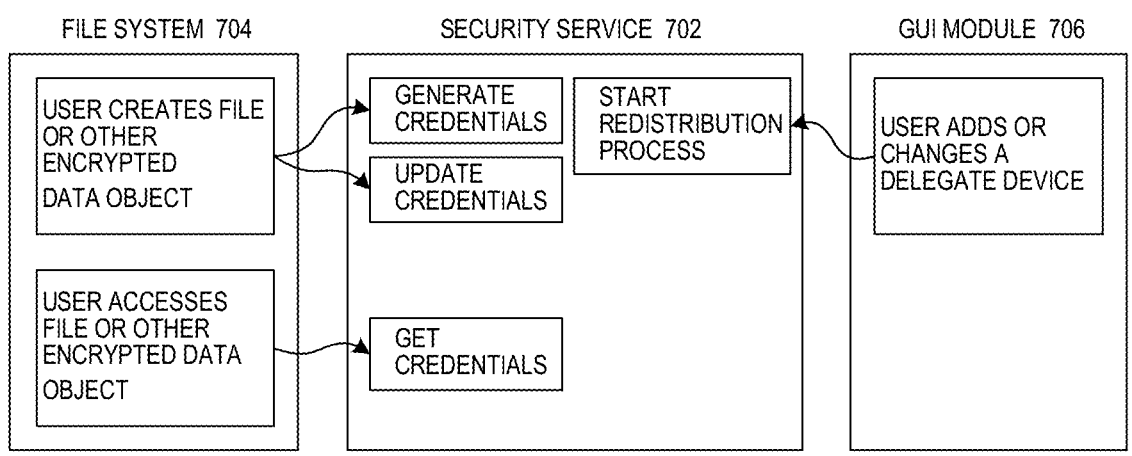
FIG. 7 is a block diagram illustrating a data flow among components of an originating device according to some embodiments of the present disclosure.

FIG. 7 is a block diagram illustrating a data flow among components of an originating device according to some embodiments of the present disclosure. The security service 702 may control communication via a relay network, key storage, and key management. The security service 702 is communicatively coupled to the file system 704 (e.g., VFS) and the GUI module 706. As an example, the security service 702 may communicate messages and notifications across a relay network related to generating, updating, and sharing credentials.

In some embodiments, a cryptographic process starts with a user or a program attempting to open a file located in a file system 704. The file system 704 could appear as a folder within a user's home directory. From the user's perspective, the file system 104 could operate like other folders on the originating device. On the back end, the files within the file system 704 folder are data stored in an encrypted manner within archive files. The user need not be aware of the archive files nor their actual location, which could be in cloud storage, on a file server, or both on the local device with the data mirrored on a cloud server (e.g., DROPBOX, GOOGLE DRIVE).

The file system 704 (as a virtual file system) may manage interactions with the file system of the originating device's storage device. An application programming interface (API) may be provided to permit communications among the modules in the originating device. For example, the file system 704 can communicate with the security service 702 that the file system 704 needs a key to decrypt data in an archive file. The security service 702 then contacts the various delegate devices, retrieves relevant key shards, reconstitutes the cryptographic key, and delivers the reconstituted cryptographic key to the file system 704. The file system 704 can then decrypt the data in the archive file. In some embodiments, the file system 704 will usually pass the relevant encrypted key shards found within the archive file to the security service 702. The security service 702 can then send those encrypted key shards to a relay server for eventual receipt by relevant delegate devices. The relevant delegate devices, using their respective private keys, can decrypt the encrypted key shards, and return unencrypted key shards to the security service 702, which can reconstitute the cryptographic key and return it to the file system 704. The file system 704 can use the reconstituted cryptographic key to decrypt the data stored in the archive file and then present the decrypted data to the relevant program.

In some embodiments, the archive file may not contain certain associated encrypted key shards. The missing key shards could be stored only on delegate devices. Under those circumstances, the security service 702 can instruct delegate devices to produce relevant key shards by using a reference number for the archive file.

The security service 702 may also be responsible for producing new cryptographic keys for the file system 704 (e.g., upon creation of a new file), using a sharing scheme to create key shards, and encrypting those key shards with public keys of respective delegate devices. The encrypted key shards can be sent to the delegate devices, and also sent back to the file system 704 for storage within the archive file.

The security service 702 can also interact with the GUI module 706 to handle with several operations including loss or removal of a delegate device, the replacement or addition of a delegate device, and change the number of either M or N key shards. These operations may require a redistribution of key shards in accordance with the key shard redistribution process described herein.

The security service 702 can interact with the GUI module 706 to process a change in the user's delegate devices for authorization or backup purposes. For example, an implementation may have a 2-of-4 configuration, meaning that at least two of four computing devices that store respective distributed key shards are required to assemble a cryptographic key that enables decryption of target data. The user's computing devices may include a laptop as an originating device, a smartphone as a primary delegate device, a tablet as a backup delegate device, and a friend's smartphone as another backup delegate device. All four devices store respective encrypted key shards and the associated private key required for decryption. Under normal circumstances, the user will only receive decryption requests on the user's primary delegate device, and the originating device will provide decrypted key shards by default. If the battery of the user's primary delegate device (e.g., smartphone) is discharged, the user may wish to switch the duty of the primary delegate device temporarily to the backup delegate device (e.g., tablet). Switching to the backup delegate device would not require a redistribution operation but could require communication via the relay server.

Setup Process

Figure 8:
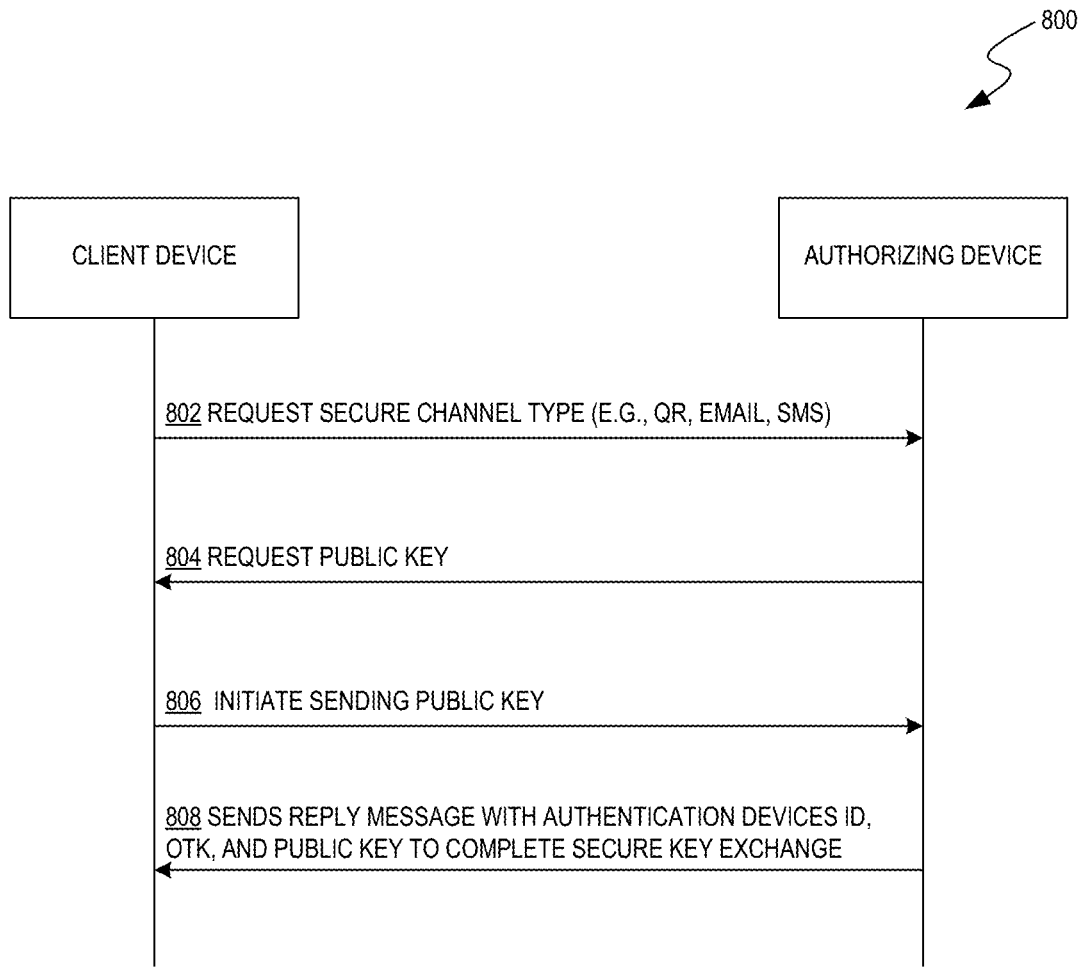
FIG. 8 is a flow diagram that illustrates a secure third-party channel (STPC) device linking according to some embodiments of the present disclosure.

The disclosed embodiments include processes for securely linking devices to exchange data such as key shards. For example, FIG. 8 is a flow diagram illustrating a secure third-party channel (STPC) device linking process 800 according to some embodiments of the present disclosure. More specifically, process 800 implements a secure communication channel for the exchange of public keys.

In step 802, a client device (a first device) can request a secure channel type (e.g., QR, email, SMS) by selecting a channel and then sending its device ID such as, for example, a random 16-byte one time key and a hash of its public key to the authorizing device (a second device). In step 804, the authorizing device requests the client device's public key. In step 806, the client device initiates sending the public key to the authorizing device. Lastly, in step 808, the authorizing device sends a reply message with an authentication device ID, one-time key (OTK), and public key to complete the secure exchange required to establish a secure link between the devices.

Figure 9:
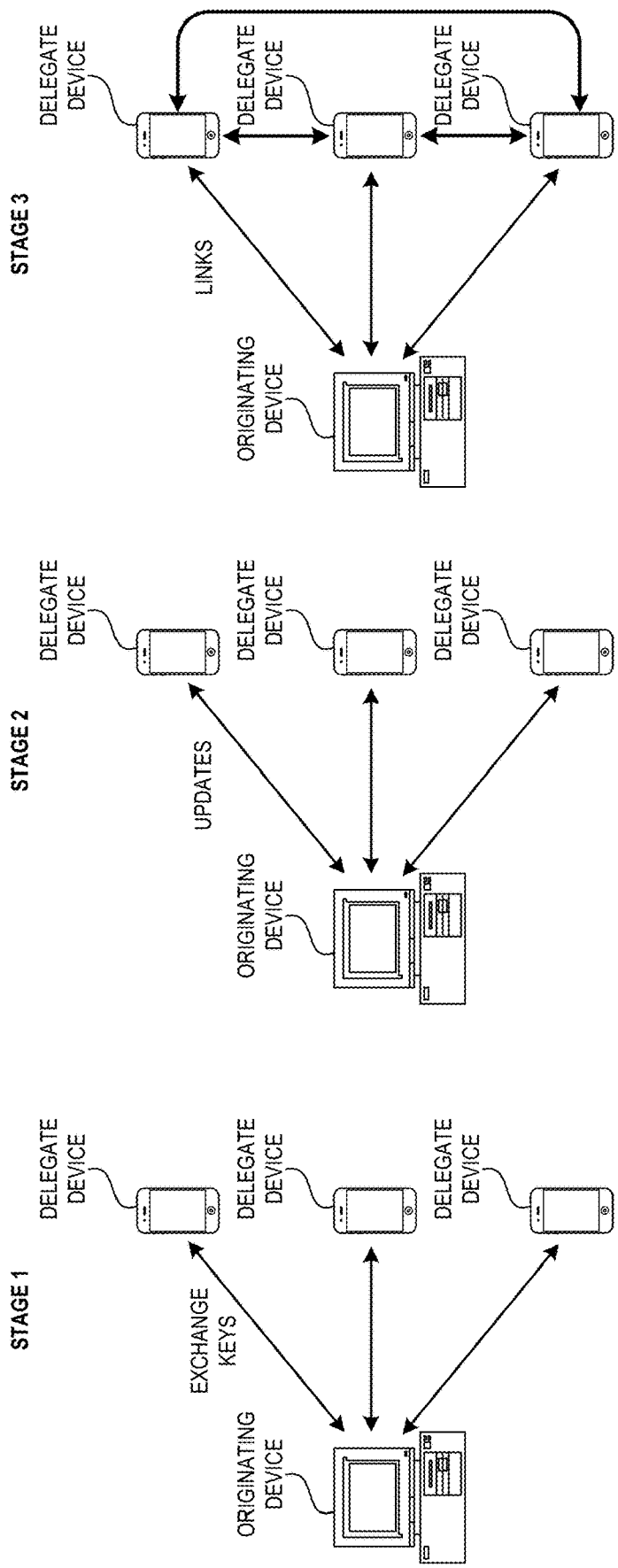
FIG. 9 is a block diagram that illustrates a setup process of onboarding procedures according to some embodiments of the present disclosure.

FIG. 9 is a block diagram that depicts a setup process for onboarding procedures according to some embodiments of the present disclosure. Stage 1 shows that an originating device can perform a secure exchange of public keys with delegate devices via the usage of the STPC mechanism of FIG. 6. All communication after this can be encrypted and signed. Stage 2 shows that after linking with the delegate devices, the originating device can send the full on-boarding information to the delegate devices which will link them to each other in stage 3. The completion illustrated in stage 3 results in all devices exchanging their public keys with each other in a secure manner. The group including the originating device and delegate devices are then ready to securely communicate key shards.

Figure 10:
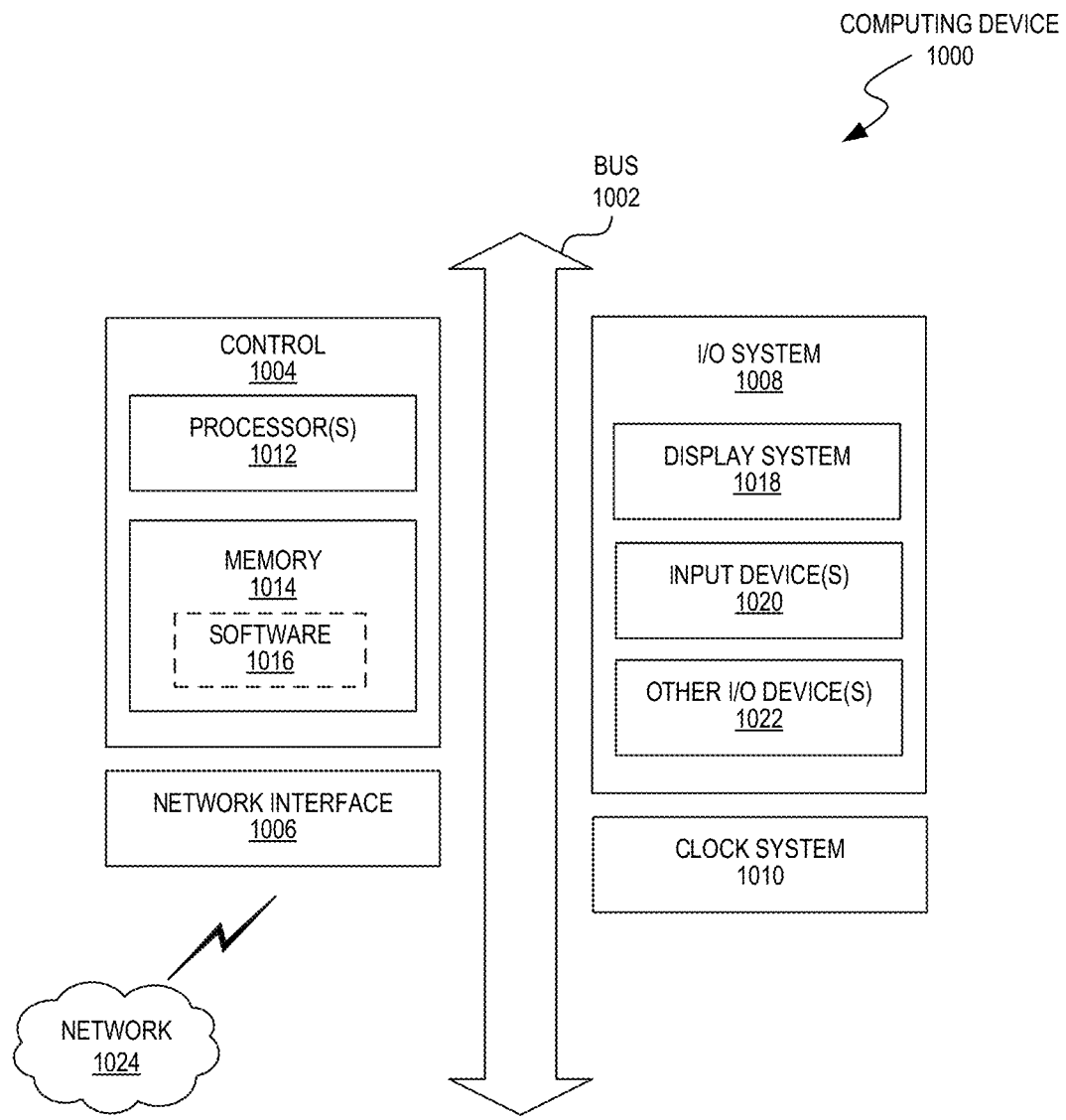
FIG. 10 is a block diagram of a computing device operable to implement aspects of the disclosed embodiments.

FIG. 10 is a block diagram of a computing device 1000 operable to implement aspects of the disclosed embodiments. The computing device 1000 may be a generic computer or specifically designed to carry out features of the system 100. The computing device 1000 may be an originating device, a relay server, or a delegate device embodied as, for example, a system-on-chip (SOC), a single-board computer (SBC) system, a server, a desktop or laptop computer, a kiosk, a mainframe, a mesh of computer systems, a handheld mobile device, or combinations thereof.

The computing device 1000 may be a standalone device or part of a distributed system that spans multiple networks, locations, machines, or combinations thereof. In some embodiments, the computing device 1000 operates as a server computer (e.g., relay server) or a client device (e.g., originating device, delegate device) in a client-server network environment, or as a peer machine in a peer-to-peer system. In some embodiments, the computing device 1000 may perform one or more steps of the disclosed embodiments in real-time, in near real-time, offline, by batch processing, or combinations thereof.

As shown, the computing device 1000 includes a bus 1002 operable to transfer data between hardware components. These components include a control 1004 (i.e., processing system), a network interface 1006, an Input/Output (I/O) system 1008, and a clock system 1010. The computing device 1000 may include other components not shown or further discussed for the sake of brevity. One having ordinary skill in the art will understand any hardware and software included but not shown in FIG. 10.

The control 1004 includes one or more processors 1012 (e.g., central processing units (CPUs), application specific integrated circuits (ASICs), and/or field programmable gate arrays (FPGAs)) and memory 1014 (which may include software 1016). The memory 1014 may include, for example, volatile memory such as random-access memory (RAM) and/or non-volatile memory such as read-only memory (ROM). The memory 1014 can be local, remote, or distributed.

A software program (e.g., software 1016), when referred to as "implemented in a computer-readable storage medium," includes computer-readable instructions stored in a memory (e.g., memory 1014). A processor (e.g., processor 1012) is "configured to execute a software program" when at least one value associated with the software program is stored in a register that is readable by the processor. In some embodiments, routines executed to implement the disclosed embodiments may be implemented as part of operating system (OS) software (e.g., MICROSOFT WINDOWS, LINUX) or a specific software application, component, program, object, module or sequence of instructions referred to as "computer programs."

As such, the computer programs typically comprise one or more instructions set at various times in various memory devices of a computer (e.g., computing device 1000) and which, when read and executed by at least one processor (e.g., processor 1012), cause the computer to perform operations to execute features involving the various aspects of the disclosed embodiments. In some embodiments, a carrier containing the aforementioned computer program product is provided. The carrier is one of an electronic signal, an optical signal, a radio signal, or a non-transitory computer-readable storage medium (e.g., memory 1014).

The network interface 1006 may include a modem or other interfaces (not shown) for coupling the computing device 1000 to other computers, for example, over the network 1024. The I/O system 1008 may operate to control various I/O devices, including peripheral devices such as a display system 1018 (e.g., a monitor or touch-sensitive display) and one or more input devices 1020 (e.g., a keyboard and/or pointing device). Other I/O devices 1022 may include, for example, a disk drive, printer, scanner, or the like. Lastly, the clock system 1010 controls a timer for use by the disclosed embodiments.

Operation of a memory device (e.g., memory 1014), such as a change in state from a binary one to a binary zero (or vice versa) may comprise a visually perceptible physical transformation. The transformation may comprise a physical transformation of an article to a different state or thing. For example, a change in state may involve accumulation and storage of charge or release of stored charge. Likewise, a change of state may comprise a physical change or transformation in magnetic orientation, or a physical change or transformation in molecular structure, such as from crystalline to amorphous or vice versa.

Figure 11:
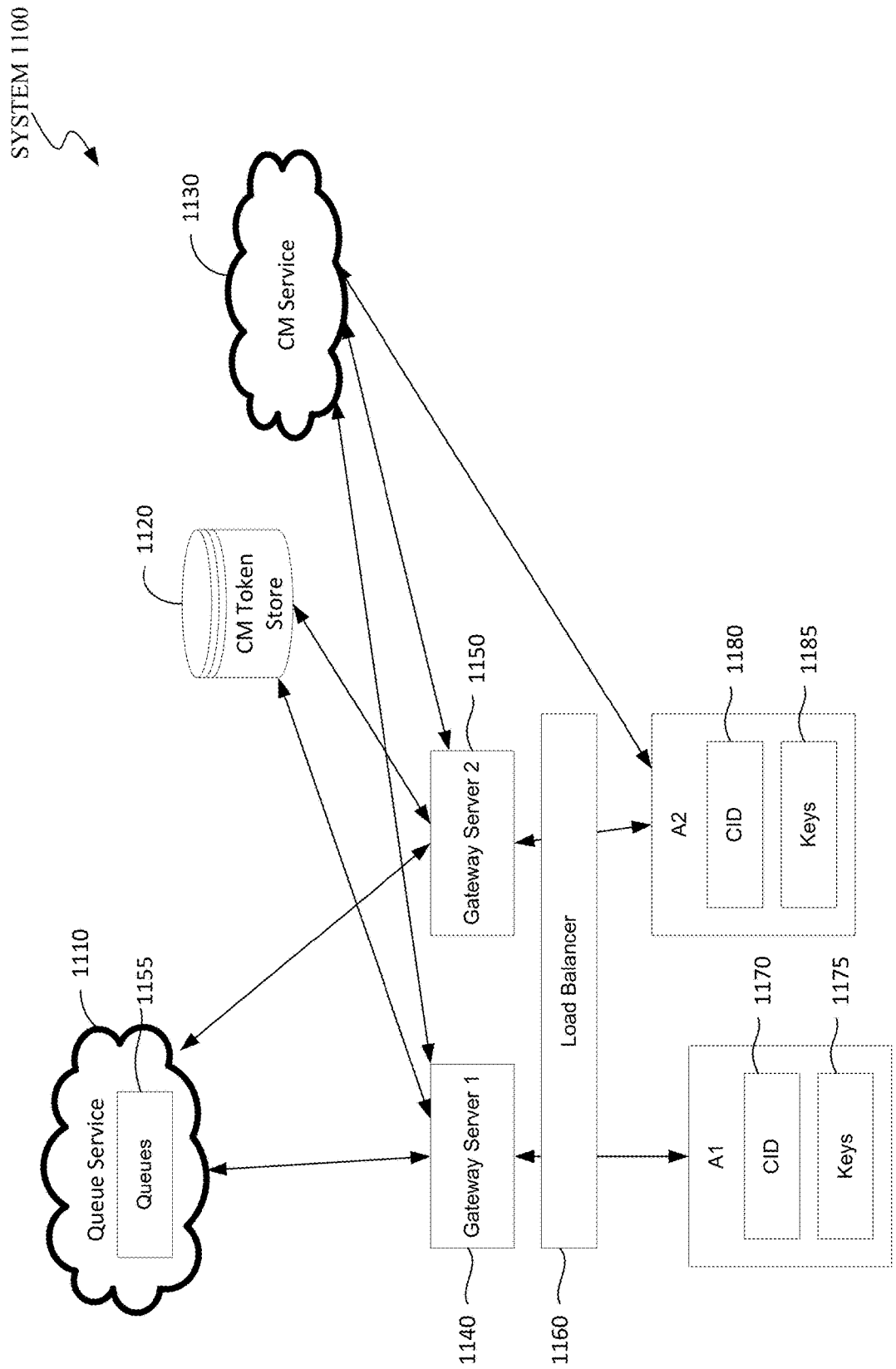
FIG. 11 is a block diagram of a system operable to implement aspects of the disclosed embodiments.

FIG. 11 is a block diagram of a system 1100 operable to implement aspects of the disclosed embodiments. The system 1100 comprises a queue service having queues 1155, a cloud messaging token store 1120, a cloud messaging service 1130, gateway servers 1140 and 1150, a load balancer 1160, and a plurality of devices, e.g., A1 and A2. Note that two devices are shown for ease of illustration and system 1100 may comprise more than two devices. Similarly, while two gateway servers are shown, additional gateway servers can be added. The system 1100 is a communication system which facilitates seamless peer-to-peer messaging. The system 1100 is designed to effectively transmit messages among heterogeneous clients with speed and reliability, while scaling to accommodate variable load. The system 1100 can be used in conjunction with the encryption methods disclosed above, e.g., encryption methods disclosed in conjunction with FIG. 2.

Devices A1 and A2 (which can be substantially similar to originating device 102 and delegate devices 106n) have unique public/private key pairs, where the private key is known only to the device that owns it and the public key is known by all other devices that wish to communicate with the device in question. Each client additionally has a client identifier (CID) which is its unique address for the sake of routing messages in the system 1100. The CID may be derived from the public key in a number of ways, including:

Taking the SHA-256 hash of the PEM encoding of the public key
Directly using the public value(s) of the key, e.g. the curve point for an elliptic curve key
Taking the SHA-256 hash of the public value(s) of the key In an embodiment, the CID may be kept at a consistent and shortened length by using just the first 16 bytes of output from the above values.

Clients establish a connection to the system 1100 using its well-known hostname, which can either directly resolve to a list of gateway server IP addresses or points to the load balancer 1160. If used, the load balancer 1160 selects a gateway server (1140 or 1150) and forwards the connection to that server. The gateway servers 1140, 1150 act as WebSocket servers and handle the client authentication process, as will be discussed in conjunction with FIG. 12 below. They also interact with their connected devices Al and A2 and the described services and stores to facilitate message delivery. Since the gateway servers 1140, 1150 do not communicate with each other directly, capacity can be expanded solely by adding more gateway servers, to the extent supported by the other components.

The queue service 1110 represents any system which can store ordered lists of messages, where each list has a separate identifier and represents a "queue." Embodiments include:

Using a SQL database where each table is a queue
Using a SQL database and a single table, where the queue is identified by a column value Using a message queue product such as IBM MQ, Apache Kafka, or Amazon SQS All gateway servers connect to the same service without the need to know about its internal structure. Within the queue service 1110, there is one queue per device 1155, created by gateway servers 1140, 1150 at the time the device is first known. This queues 1155 hold all of the messages destined for that device, and these messages may be kept in the queue via a number of strategies:

Retain all messages indefinitely

Retain all messages for a set amount of time, such as 2 weeks

Variably retain messages based on their attributes, such as message type or message priority Messages may optionally be removed from a queue after having been received by the client.

The Cloud Messaging (CM) service 1130, such as Firebase, is used to deliver notifications and wake-up messages to supported devices. Such a device will have a unique CM token, which it provides during its registration. The CM token store 1120 is used to map CIDs to CM tokens for the benefit of the gateway servers 1140, 1150. The servers 1140, 1150 interact with the CM service 1130 using these tokens in order to trigger the necessary notifications and messages which are delivered to devices.

Figure 12:
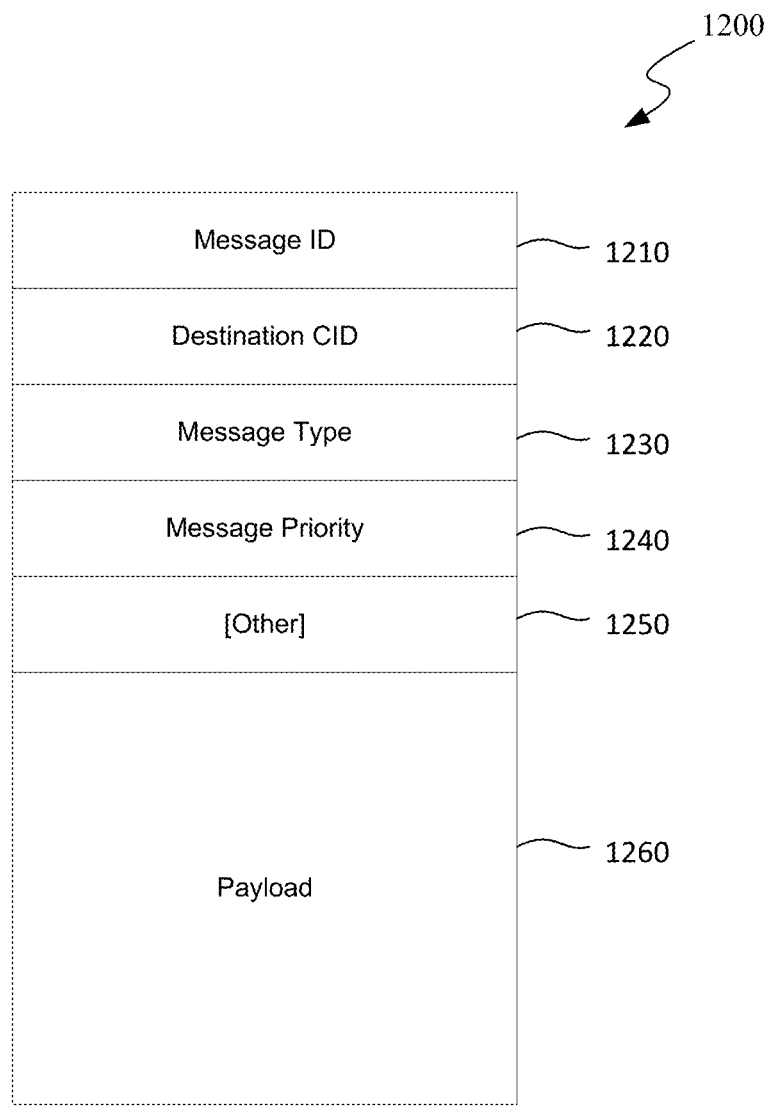
FIG. 12 is a block diagram of a packet for use in the system of FIG. 11.

FIG. 12 is a block diagram of a packet 11200 for use in the system 1100. The packet includes fields such as message ID 1210, which can be used for deduplication and message confirmation/deletion; destination CID 1220; message type 1230, indicating the nature of the message at an application level; message priority 1240, indicating how time-sensitive the message is or what its retention strategy should be; other 1250 and the actual payload 1260, which includes shards, public keys and encrypted data that is transmitted as discussed in conjunction with FIG. 2. The payload 1260 may be opaque to the system 1260. These fields and the payload may be combined and encoded via several strategies, such as JSON, BSON, and Protocol Buffers.

Figure 13:
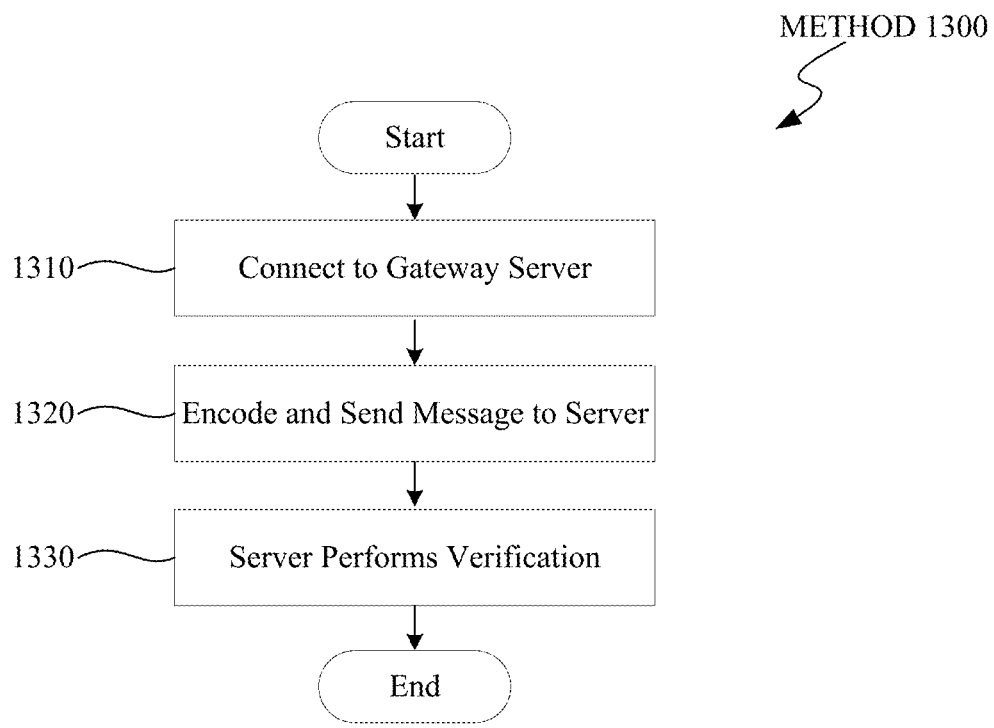
FIG. 13 is a flow diagram illustrating a method of connecting to a network according to an embodiment.

FIG. 13 is a flow diagram illustrating a method 1300 of connecting to a network according to an embodiment. The method 1300 comprises connecting to a gateway server 1310; encoding and transmitting 1320 a message comprising a public key, a client identifier of one of the plurality of devices, and a signature of a private key of at least one field of the message; and verifying 1330 authenticity of the one of the plurality of devices by confirming the provided public key is valid, the signature matches the public key, and client identifier matches the public key.

In order to connect to the system 1100, a device A1, A2 first establishes a WebSocket connection with one of the gateway servers 1140, 1150, optionally using transport layer security (TLS). The device A1, A2 then encodes and sends a message containing its public key and, optionally, its claimed CID. The message additionally contains a signature from the client's private key of pertinent fields of the message such as the public key and the claimed CID. The server 1140, 1150 decodes this message and verifies its authenticity by ensuring that:

The provided public key is valid

The signature of the signed data matches the provided public key

The provided CID matches the public key per the steps described above, if applicable If all of the verifications succeed, the device A1, A2 is considered to be registered under its CID. Registered devices are able to send messages over the system 1100 and will receive messages destined for their CID. If any of the registration verifications fail, the device A1, A2 will not be considered registered, will not be able to send or receive messages, and may have its connection terminated by the server 1140, 1150.

In an embodiment, a gateway server 1140 or 1150 can require proof of work for registration. In this embodiment, gateway server requires an M-bit proof of work in order to be used. The connecting device A1 or A2 will be rejected if it fails to provide the correct proof of work. A proof of work is exponential in difficulty depending on the number of bits. Specifically, the connecting device A1 and A2 must repeatedly hash their public key with a nonce until the number of leading null bits of the hash are equivalent to the required proof. At any time, the servers 1140, 1150 can reject a connection and require additional proof. This can be done with bias toward IP address that are more heavily using the network. In this way, the system 1100 can defend itself from denial of service attacks.

Figure 14:
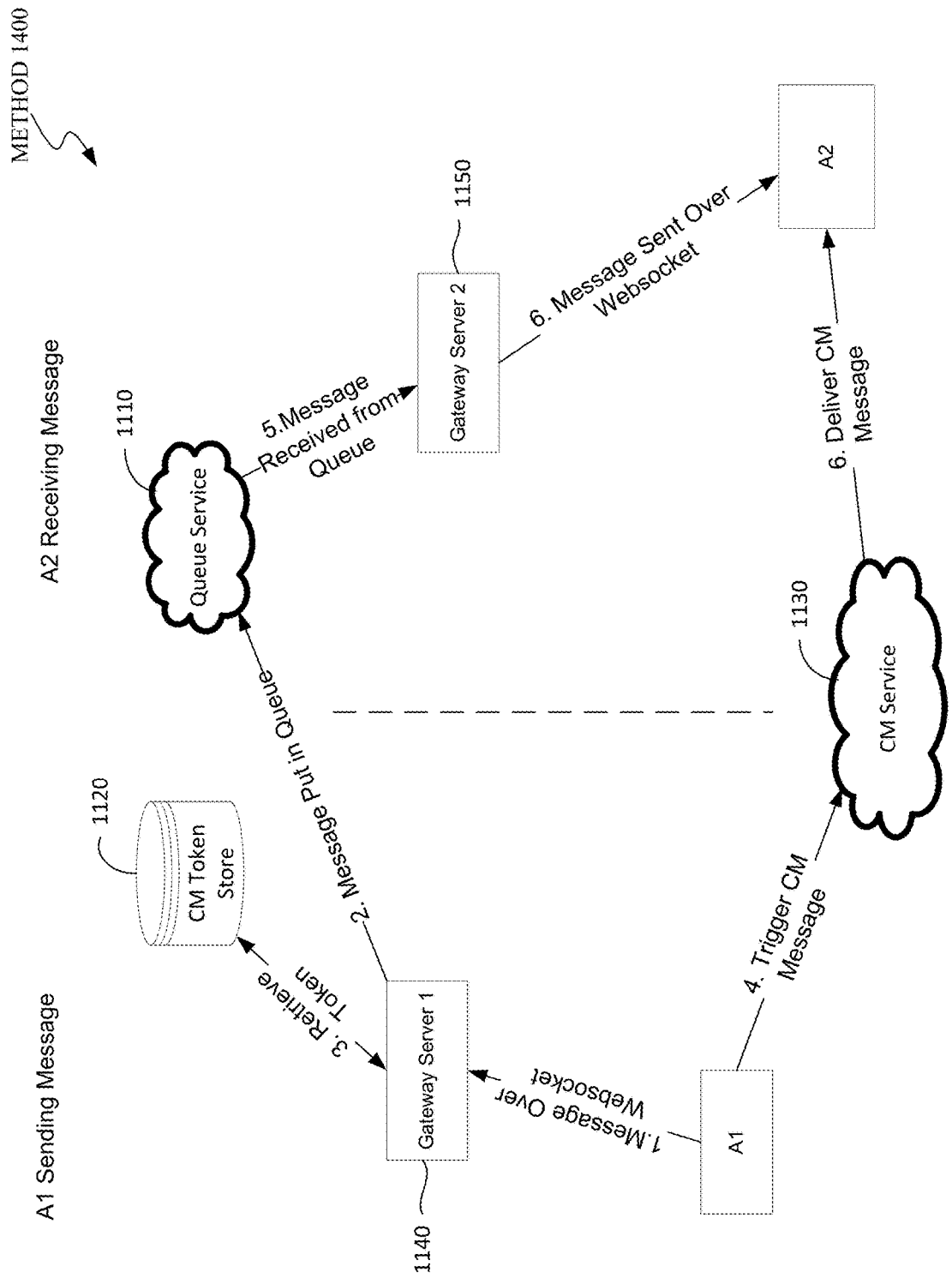
FIG. 14 is a flow diagram illustrating a method of transmitting data via the connected network.

FIG. 14 is a flow diagram illustrating a method 1400 of transmitting data via the connected network. Messages can be sent by any device A1, A2, etc. registered on a gateway server 1140, 1150. When a device is registered, it will be sent any messages which arrive in that device's queue. It is often impractical or impossible for a device to be continuously connected to the system 1100, particularly when the client is an application on a mobile phone. In this case, the system's 1100 use of CM allows the device to connect just when necessary. When a message destined for this device is received, the system 1100 determines if it warrants use of CM based on the message type and/or message priority, as described above. If it is warranted, the gateway server 1140, 1150 triggers the CM 1130 service to send an CM message to the device. This message need not have meaningful content, but primarily serves as a trigger for the device to connect to the system 1100 and retrieve its messages. This is effective on a mobile phone because the device has persistent services which receive the CM messages and can deliver them to the mobile application, regardless of whether the application is already running.

The method 1400 for message delivery from the device A1 to A2 comprises

1. Client A1 sends the message over the WebSocket with which it is connected to its gateway server 1140.

2. Gateway server 1140 attempts to locate a queue for the recipient, device A2. If no such queue exists, it creates it. The server 1140 puts the message in this queue via the queue service 1110.

3. Gateway server 1140 looks for an CM token for device A2 in the CM store 1120.

4. If an CM token was found, gateway server 1140 sends a request to the CM service 1130 to trigger an CM message to the token.

5. Gateway server 1150 receives the message from A2's queue.

6. The CM service 1130 delivers the CM message to device A2. If A2 was not already connected to the system 1100, it uses this as a trigger to establish a connection at this point.

7. Gateway server 1150 delivers the message to client B over its WebSocket connection.

Note that if device A2 is not already connected to the system 1100, and the device does not support CM or the CM message fails to be delivered, the message from A1 is not lost. Whenever A2 does connect to the system 1100, its gateway server 1150 will retrieve messages from the queue service and deliver the message at that time, assuming it has not passed its persistence period.

As mentioned above, the message can be in format of the packet 1200 and the payload 1260 may include anything transmitted between devices as described above, e.g, shards in FIG. 2.

Examples of the disclosed embodiments include:

1. A method, comprising:
registering, by a first device having a public key, with a gateway server by providing a proof of work based on the first device public key;
encrypting data with a first device's symmetric key;
generating, with a threshold cryptography data-sharing scheme, a plurality of key shards based on the symmetric key such that the symmetric key can be reconstituted from less than all of the plurality of key shards;
encrypting the plurality of key shards with public keys from, respectively, a plurality of devices;
transmitting, through the gateway, the encrypted plurality of key shards and encrypted data to at least one queue in a queue service, wherein there is one queue for each device of the plurality of devices;
triggering a cloud message from a cloud message service to one or more devices of the plurality of devices corresponding to the at least one queue, thereby causing the one or more devices to connect to a network hosting the queue service;
transmitting the encrypted plurality of key shards and encrypted data from the queue service to the one or more devices corresponding to the at least one queue; and
storing the encrypted data and the plurality of key shards encrypted with the plurality of devices' public keys in one or more non-transitory memory devices such that the encrypted data is secured at one of the one or more non-transitory memory devices and decryptable with the plurality of key shards encrypted with the first devices' public keys by reassembling the plurality of key shards encrypted with the plurality of devices' public keys into the first device's symmetric key.

2. The method of example 1, further comprising:
receiving, at the first device, a request to decrypt the data encrypted with the symmetric key;
retrieving shards of the symmetric key;
requesting decryption by the plurality of devices of the shards until a threshold number of shards is reached;
reconstituting the symmetric key from the decrypted shards; and
decrypting the encrypted data with the symmetric key;
wherein the receiving shards and requesting decryption includes transmitting shards and requests, respectively, via the at least one queue and triggering cloud messages to the one or more devices corresponding to the at least one queue.

3. The method of any of the preceding examples, further comprising:
retrieving at least one token from a cloud message store corresponding to the at least one queue; and wherein the triggering is in response to the retrieving.

4. The method of any of the preceding examples, wherein the transmitting to and from the at least one queue transmits the encrypted plurality of key shards and encrypted data in packets having a client identifier identifying a destination device from the plurality of devices and corresponding queue from the at least one queue.

5. The method of any of the preceding examples, further comprising generating the client identifier by taking a SHA-256 hash privacy enhanced mail encoding of a public key of the destination device.

6. The method of any of the preceding examples, further comprising generating the client identifier based on a curve point for an elliptic curve key of the destination device.

7. The method of any of the preceding examples, further comprising generating the client identifier by taking a SHA-256 HASH of a public key of the destination device.

8. The method of any of the preceding examples, further comprising:
connecting to the gateway server;
encoding and transmitting a message comprising a public key, a client identifier of one of the plurality of devices, and a signature of a private key of at least one field of the message; and
verifying authenticity of the one of the plurality of devices by confirming the public key from the transmitted message is valid, the signature matches the public key, and client identifier matches the public key.

9. The method of any of the preceding examples, further comprising load balancing the transmitting to and from the at least one queue with a load balancer.

10. A computer-readable medium having stored thereon instructions to cause to a computer to execute a method, the method comprising:
registering, by a first device having a public key, with a gateway server by providing a proof of work based on the first device public key;
encrypting data with a first device's symmetric key;
generating, with a threshold cryptography data-sharing scheme, a plurality of key shards based on the symmetric key such that the symmetric key can be reconstituted from less than all of the plurality of key shards;
encrypting the plurality of key shards with public keys from, respectively, a plurality of devices;
transmitting, through the gateway, the encrypted plurality of key shards and encrypted data to at least one queue in a queue service, wherein there is one queue for each device of the plurality of devices;
causing triggering a cloud message from a cloud message service to one or more devices of the plurality of devices corresponding to the at least one queue, thereby causing the one or more devices to connect to a network hosting the queue service;
causing transmitting the encrypted plurality of key shards and encrypted data from the queue service to the one or more devices corresponding to the at least one queue; and
storing the encrypted data and the plurality of key shards encrypted with the plurality of devices' public keys in one or more non-transitory memory devices such that the encrypted data is secured at one of the one or more non-transitory memory devices and decryptable with the plurality of key shards encrypted with the first devices' public keys by reassembling the plurality of key shards encrypted with the plurality of devices' public keys into the first device's symmetric key.

11. A computing device comprising:
a processor; and
one or more memories that include instructions that, when executed by the processor, cause the computing device to:
register, by a first device having a public key, with a gateway server by providing a proof of work based on the first device public key;
encrypt data with a first device's symmetric key;
generate, with a threshold cryptography data-sharing scheme, a plurality of key shards based on the symmetric key such that the symmetric key can be reconstituted from less than all of the plurality of key shards;

encrypt the plurality of key shards with public keys from, respectively, a plurality of devices;

transmit, through the gateway, the encrypted plurality of key shards and encrypted data to at least one queue in a queue service, wherein there is one queue for each device of the plurality of devices;

cause triggering a cloud message from a cloud message service to one or more devices of the plurality of devices corresponding to the at least one queue, thereby causing the one or more devices to connect to a network hosting the queue service;

cause transmitting the encrypted plurality of key shards and encrypted data from the queue service to the one or more devices corresponding to the at least one queue; and storing the encrypted data and the plurality of key shards encrypted with the plurality of devices' public keys in one or more non-transitory memory devices such that the encrypted data is secured at one of the one or more non-transitory memory devices and decryptable with the plurality of key shards encrypted with the first devices' public keys by reassembling the plurality of key shards encrypted with the plurality of devices' public keys into the first device's symmetric key.

12. The computing device of any of the preceding examples, wherein the instructions, when executed, further cause:

receiving, at the first device, a request to decrypt the data encrypted with the symmetric key;

retrieving shards of the symmetric key;

requesting decryption by the plurality of devices of the shards until a threshold number of shards is reached;

reconstituting the symmetric key from the decrypted shards; and decrypting the encrypted data with the symmetric key;

wherein the receiving shards and requesting decryption includes transmitting shards and requests, respectively, via the at least one queue and triggering cloud messages to the one or more devices corresponding to the at least one queue.

The computing device of any of the preceding examples, wherein the instructions, when executed, further cause:

retrieving at least one token from a cloud message store corresponding to the at least one queue; and wherein the triggering is in response to the retrieving.

14. The computing device of any of the preceding examples, wherein the transmitting to and from the at least one queue transmits the encrypted plurality of key shards and encrypted data in packets having a client identifier identifying a destination device from the plurality of devices and corresponding queue from the at least one queue.

15. The computing device of any of the preceding examples, wherein the instructions, when executed, further cause generating the client identifier by taking a SHA-256 hash privacy enhanced mail encoding of a public key of the destination device.

16. The computing device of any of the preceding examples, wherein the instructions, when executed, further cause generating the client identifier based on a curve point for an elliptic curve key of the destination device.

17. The computing device of any of the preceding examples, wherein the instructions, when executed, further cause generating the client identifier by taking a SHA-256 HASH of a public key of the destination device.

18. The computing device of any of the preceding examples, wherein the instructions, when executed, further cause:

connecting to the gateway server;

encoding and transmitting a message comprising a public key, a client identifier of one of the plurality of devices, and a signature of a private key of at least one field of the message; and verifying authenticity of the one of the plurality of devices by confirming the public key from the transmitted message is valid, the signature matches the public key, and client identifier matches the public key.

19. The computing device of any of the preceding examples, wherein the instructions, when executed, further cause load balancing the transmitting to and from the at least one queue with a load balancer.

Although the described flowcharts can show operations as a sequential process, many of the operations can be performed in parallel or concurrently. In addition, the order of the operations may be re-arranged. A process is terminated when its operations are completed. A process may correspond to a method, a procedure, an algorithm, etc. The operations of methods may be performed in whole or in part, may be performed in conjunction with some or all of the operations in other methods, and may be performed by any number of different systems, such as the systems described herein, or any portion thereof, such as a processor included in any of the systems.

Aspects of the disclosed embodiments may be described in terms of algorithms and symbolic representations of operations on data bits stored on memory. These algorithmic descriptions and symbolic representations generally include a sequence of operations leading to a desired result. The operations require physical manipulations of physical quantities. Usually, though not necessarily, these quantities take the form of electrical or magnetic signals capable of being stored, transferred, combined, compared, and otherwise manipulated. Customarily, and for convenience, these signals are referred to as bits, values, elements, symbols, characters, terms, numbers, or the like. These and similar terms are associated with physical quantities and are merely convenient labels applied to these quantities.

While embodiments have been described in the context of fully functioning computers, those skilled in the art will appreciate that the various embodiments are capable of being distributed as a program product in a variety of forms and that the disclosure applies equally regardless of the particular type of machine or computer-readable media used to actually effect the embodiments.

While the disclosure has been described in terms of several embodiments, those skilled in the art will recognize that the disclosure is not limited to the embodiments described herein and can be practiced with modifications and alterations within the spirit and scope of the invention. Those skilled in the art will also recognize improvements to the embodiments of the present disclosure. All such improvements are considered within the scope of the claims disclosed herein. Thus, the description is to be regarded as illustrative instead of limiting.

What is claimed is:

1. A method, comprising:

registering, by a first device having a public key and a symmetric key, with a gateway server by providing a proof of work based on the first device's public key;

encrypting data with the first device's symmetric key;

generating, with a threshold cryptography data-sharing scheme, a plurality of key shards based on the symmetric key where the symmetric key can be reconstituted from less than all of the plurality of key shards;

encrypting the plurality of key shards with public keys from, respectively, a plurality of devices;

transmitting, through the gateway, the encrypted plurality of key shards and encrypted data to at least one queue in a queue service, wherein there is one queue for each device of the plurality of devices;

triggering a cloud message from a cloud message service to one or more devices of the plurality of devices corresponding to the at least one queue, thereby causing the one or more devices to connect to a network hosting the queue service;

transmitting the encrypted plurality of key shards and encrypted data from the queue service to the one or more devices corresponding to the at least one queue; and storing the encrypted data and the plurality of key shards encrypted with the plurality of devices' public keys in one or more non-transitory memory devices where the encrypted data is secured at one of the one or more non-transitory memory devices and decryptable with the plurality of key shards encrypted with the first devices' public key by reassembling the plurality of key shards encrypted with the plurality of devices' public keys into the first device's symmetric key.

2. The method of claim 1, further comprising:

receiving, at the first device, a request to decrypt the data encrypted with the symmetric key;

retrieving shards of the symmetric key;

requesting decryption by the plurality of devices of the shards until a threshold number of shards is reached;

reconstituting the symmetric key from the decrypted shards; and decrypting the encrypted data with the symmetric key;

wherein the receiving shards and requesting decryption includes transmitting shards and requests, respectively, via the at least one queue and triggering cloud messages to the one or more devices corresponding to the at least one queue.

3. The method of claim 1, further comprising:

retrieving at least one token from a cloud message store corresponding to the at least one queue; and wherein the triggering is in response to the retrieving.

4. The method of claim 1, wherein the transmitting to and from the at least one queue transmits the encrypted plurality of key shards and encrypted data in packets having a client identifier identifying a destination device from the plurality of devices and corresponding queue from the at least one queue.

5. The method of claim 4, further comprising generating the client identifier by taking a SHA-256 hash privacy enhanced mail encoding of a public key of the destination device.

6. The method of claim 4, further comprising generating the client identifier based on a curve point for an elliptic curve key of the destination device.

7. The method of claim 4, further comprising generating the client identifier by taking a SHA-256 HASH of a public key of the destination device.

8. The method of claim 4, further comprising:

connecting to the gateway server;

encoding and transmitting a message comprising a public key, a client identifier of one of the plurality of devices, and a signature of a private key of at least one field of the message; and verifying authenticity of the one of the plurality of devices by confirming the public key from the transmitted message is valid, the signature matches the public key, and the client identifier of one of the plurality of devices matches the public key.

9. The method of claim 1, further comprising load balancing the transmitting to and from the at least one queue with a load balancer.

10. A non-transitory computer-readable medium having stored thereon instructions to cause to a computer to execute a method, the method comprising:

registering, by a first device having a public key and a symmetric key, with a gateway server by providing a proof of work based on the first device's public key;

encrypting data with the first device's symmetric key;

generating, with a threshold cryptography data-sharing scheme, a plurality of key shards based on the symmetric key where the symmetric key can be reconstituted from less than all of the plurality of key shards;

encrypting the plurality of key shards with public keys from, respectively, a plurality of devices;

transmitting, through the gateway, the encrypted plurality of key shards and encrypted data to at least one queue in a queue service, wherein there is one queue for each device of the plurality of devices;

causing triggering a cloud message from a cloud message service to one or more devices of the plurality of devices corresponding to the at least one queue, thereby causing the one or more devices to connect to a network hosting the queue service;

causing transmitting the encrypted plurality of key shards and encrypted data from the queue service to the one or more devices corresponding to the at least one queue; and storing the encrypted data and the plurality of key shards encrypted with the plurality of devices' public keys in one or more non-transitory memory devices where the encrypted data is secured at one of the one or more non-transitory memory devices and decryptable with the plurality of key shards encrypted with the first devices' public key by reassembling the plurality of key shards encrypted with the plurality of devices' public keys into the first device's symmetric key.

11. A first computing device comprising:

a processor; and one or more memories that include instructions that, when executed by the processor, cause the computing device to:

register, by the first device, the first device having a public key and a symmetric key, with a gateway server by providing a proof of work based on the first device's public key;

encrypt data with the first device's symmetric key;

generate, with a threshold cryptography data-sharing scheme, a plurality of key shards based on the symmetric key where the symmetric key can be reconstituted from less than all of the plurality of key shards;

encrypt the plurality of key shards with public keys from, respectively, a plurality of devices, each device comprising a processor;

transmit, through the gateway, the encrypted plurality of key shards and encrypted data to at least one queue in a queue service, wherein there is one queue for each device of the plurality of devices;

cause triggering a cloud message from a cloud message service to one or more devices of the plurality of devices corresponding to the at least one queue, thereby causing the one or more devices to connect to a network hosting the queue service;

cause transmitting the encrypted plurality of key shards and encrypted data from the queue service to the one or more devices corresponding to the at least one queue; and storing the encrypted data and the plurality of key shards encrypted with the plurality of devices' public keys in one or more non-transitory memory devices where the encrypted data is secured at one of the one or more non-transitory memory devices and decryptable with the plurality of key shards encrypted with the first devices' public key by reassembling the plurality of key shards encrypted with the plurality of devices' public keys into the first device's symmetric key.

12. The computing device of claim 11, wherein the instructions, when executed, further cause:
receiving, at the first device, a request to decrypt the data encrypted with the symmetric key;
retrieving shards of the symmetric key;
requesting decryption by the plurality of devices of the shards until a threshold number of shards is reached;
reconstituting the symmetric key from the decrypted shards; and
decrypting the encrypted data with the symmetric key;
wherein the receiving shards and requesting decryption includes transmitting shards and requests, respectively, via the at least one queue and triggering cloud messages to the one or more devices corresponding to the at least one queue.

13. The computing device of claim 11, wherein the instructions, when executed, further cause:
retrieving at least one token from a cloud message store corresponding to the at least one queue; and
wherein the triggering is in response to the retrieving.

14. The computing device of claim 11, wherein the transmitting to and from the at least one queue transmits the encrypted plurality of key shards and encrypted data in packets having a client identifier identifying a destination device from the plurality of devices and corresponding queue from the at least one queue.

15. The computing device of claim 14, wherein the instructions, when executed, further cause generating the client identifier by taking a SHA-256 hash privacy enhanced mail encoding of a public key of the destination device.

16. The computing device of claim 14, wherein the instructions, when executed, further cause generating the client identifier based on a curve point for an elliptic curve key of the destination device.

17. The computing device of claim 14, wherein the instructions, when executed, further cause generating the client identifier by taking a SHA-256 HASH of a public key of the destination device.

18. The computing device of claim 14, wherein the instructions, when executed, further cause:
connecting to the gateway server;
encoding and transmitting a message comprising a public key, a client identifier of one of the plurality of devices, and a signature of a private key of at least one field of the message; and
verifying authenticity of the one of the plurality of devices by confirming the public key from the transmitted message is valid, the signature matches the public key, and the client identifier of one of the plurality of devices matches the public key.

19. The computing device of claim 11, wherein the instructions, when executed, further cause load balancing the transmitting to and from the at least one queue with a load balancer.

* * * * *